US012621893B2

(12) United States Patent (10) Patent No.: US 12,621,893 B2
Koshta et al. (45) Date of Patent: May 5, 2026

(54) OPTIMIZING USE OF PDU SESSION STATUS IE

(71) Applicant: APPLE INC., Cupertino, CA (US)

(72) Inventors: Nirlesh Koshta, Bengaluru (IN); Anikethan Ramakrishna Vijaya Kumar, Bengaluru (IN); Basant Kumar, Bengaluru (IN); Krisztian Kiss, Rancho Santa Fe, CA (US); Pradeep Pangi, Bangalore (IN); Sridhar Prakasam, Fremont, CA (US)

(73) Assignee: APPLE INC., Cupertino, CA (US)

( * ) Notice: Subject to any disclaimer, the term of this patent is extended or adjusted under 35 U.S.C. 154(b) by 391 days.

(21) Appl. No.: 18/250,833

(22) PCT Filed: Sep. 3, 2021

(86) PCT No.: PCT/US2021/071362
§ 371 (c)(1),
(2) Date: Apr. 27, 2023

(87) PCT Pub. No.: WO2022/099230
PCT Pub. Date: May 12, 2022

(65) Prior Publication Data
US 2023/0397281 A1 Dec. 7, 2023

(30) Foreign Application Priority Data
Nov. 4, 2020 (IN) .............................. 202041048158

(51) Int. Cl.
*H04W 76/18* (2018.01)
*H04W 48/18* (2009.01)
(Continued)

(52) U.S. Cl.
CPC ........... *H04W 76/18* (2018.02); *H04W 48/18* (2013.01); *H04W 68/02* (2013.01); *H04W 76/12* (2018.02)

(58) Field of Classification Search
CPC ..... H04W 76/18; H04W 48/18; H04W 68/02; H04W 76/12; H04W 76/30; H04W 60/00; H04W 76/22
(Continued)

(56) References Cited

U.S. PATENT DOCUMENTS

| | | | |
|---|---|---|---|
| 2019/0313311 A1 | 10/2019 | Huang-fu et al. | |
| 2020/0275511 A1 | 8/2020 | Liu et al. | |
| 2020/0280948 A1 | 9/2020 | Youn et al. | |
| 2020/0404734 A1 | 12/2020 | Watfa et al. | |

FOREIGN PATENT DOCUMENTS

| | | | |
|---|---|---|---|
| CN | 110582995 A | 12/2019 | |
| CN | 111587589 A | 8/2020 | |

(Continued)

OTHER PUBLICATIONS

Apple , "Inclusion of PDU Session Status IE in Service Request", C1-207292, 3GPP TSG-CT WG1 Meeting #127-e, Electronic Meeting, Change Request 24.501 CR 2897 Rev Current version: 17.0.0, Nov. 16-23, 2020, 24 pages.

(Continued)

*Primary Examiner* — Huy C Ho
(74) *Attorney, Agent, or Firm* — Dorsey & Whitney LLP

(57) ABSTRACT

Systems and methods for managing synchronization of protocol data unit (PDU) sessions between a user equipment (UE) and a network are disclosed herein. In some embodiments, a determination of whether a message comprising a PDU session status information element (IE) should be sent is based on previous messaging between peer entities of the network. In some embodiments, a determination that the peer entity is informed of a relevant PDU session status is (Continued)

made after expected reply messaging is received in response to prior messaging. In some cases, a reply message without a PDU session status IE is sent from one entity to a peer entity when it is determined that each entity has a matching PDU session status. Cases involving failures detected at the network, and cases where an entity activates a data radio bearer (DRB) of a PDU session that is inactive at its peer are also discussed.

17 Claims, 14 Drawing Sheets

(51) Int. Cl.
  *H04W 68/02* (2009.01)
  *H04W 76/12* (2018.01)
(58) Field of Classification Search
  USPC ......................................................... 370/329
  See application file for complete search history.

(56) References Cited

FOREIGN PATENT DOCUMENTS

| EP | 4236586 A2 * | 8/2023 | ............ H04W 76/15 |
| WO | 2019098641 A1 | 5/2019 | |

OTHER PUBLICATIONS

Apple , "Inclusion of PDU Session Status IE in Service Request", C1-211388, 3GPP TSG-CT WG1 Meeting #128-e, Electronic Meeting, Change Request 24.501 CR 2897 Rev 3 Current version: 17.1.0, Feb. 25-Mar. 5, 2021, 9 pages.
Ericsson , "PDU session status scope", C1-181715, 3GPP TSG-CT WG1 Meeting #109, Montreal (Canada), Agenda Item 5.2.2.3, Feb. 26-Mar. 2, 2018, 16 pages.
PCT/US2021/071362 , Invitation to Pay Additional Fees And, Where Applicable, Protest Fee, Dec. 21, 2021, 19 pages.
PCT/US2021/071362 , International Search Report and Written Opinion, Feb. 11, 2022, 22 pages.

* cited by examiner

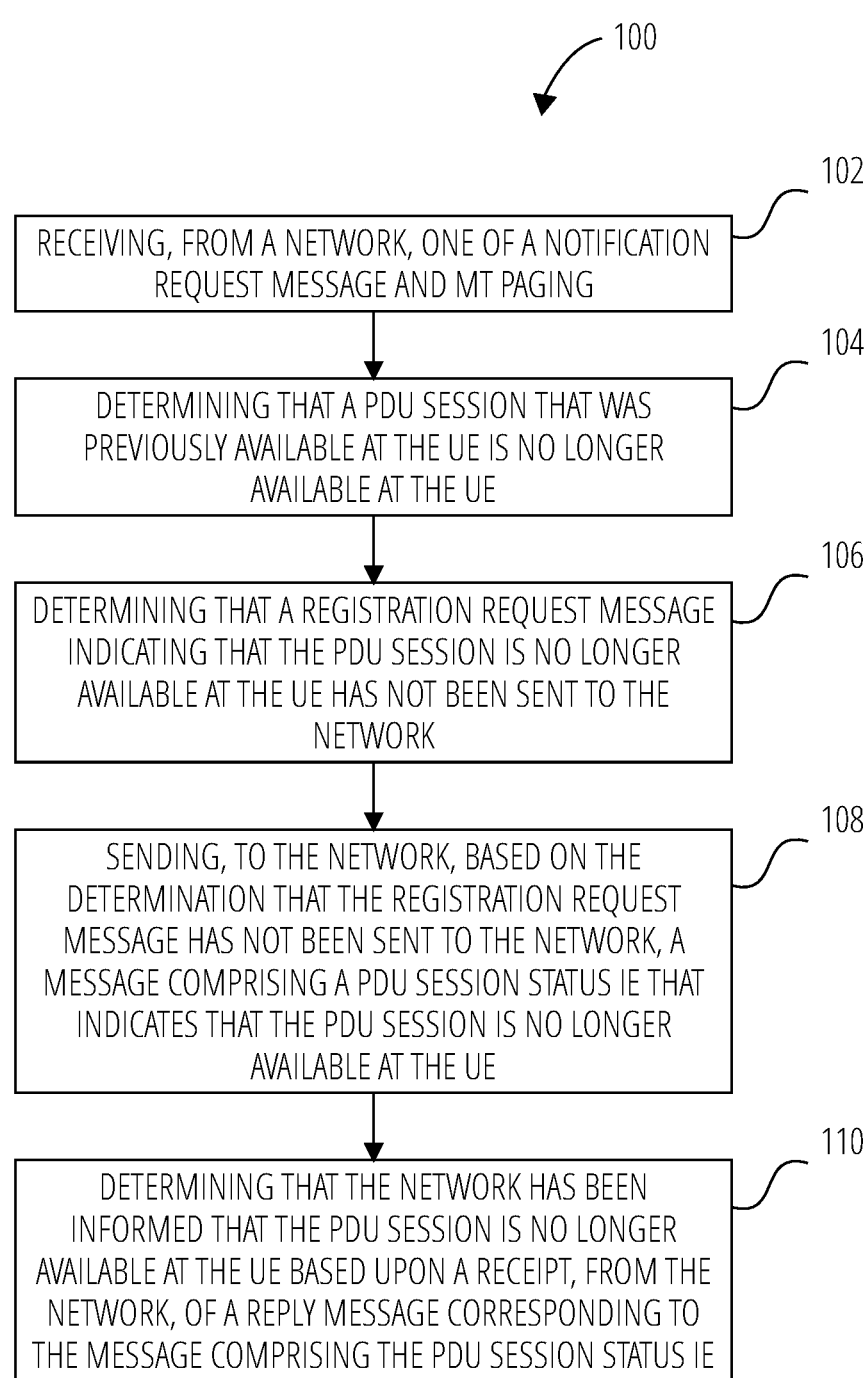

~ 100

102

RECEIVING, FROM A NETWORK, ONE OF A NOTIFICATION REQUEST MESSAGE AND MT PAGING

104

DETERMINING THAT A PDU SESSION THAT WAS PREVIOUSLY AVAILABLE AT THE UE IS NO LONGER AVAILABLE AT THE UE

106

DETERMINING THAT A REGISTRATION REQUEST MESSAGE INDICATING THAT THE PDU SESSION IS NO LONGER AVAILABLE AT THE UE HAS NOT BEEN SENT TO THE NETWORK

108

SENDING, TO THE NETWORK, BASED ON THE DETERMINATION THAT THE REGISTRATION REQUEST MESSAGE HAS NOT BEEN SENT TO THE NETWORK, A MESSAGE COMPRISING A PDU SESSION STATUS IE THAT INDICATES THAT THE PDU SESSION IS NO LONGER AVAILABLE AT THE UE

110

DETERMINING THAT THE NETWORK HAS BEEN INFORMED THAT THE PDU SESSION IS NO LONGER AVAILABLE AT THE UE BASED UPON A RECEIPT, FROM THE NETWORK, OF A REPLY MESSAGE CORRESPONDING TO THE MESSAGE COMPRISING THE PDU SESSION STATUS IE

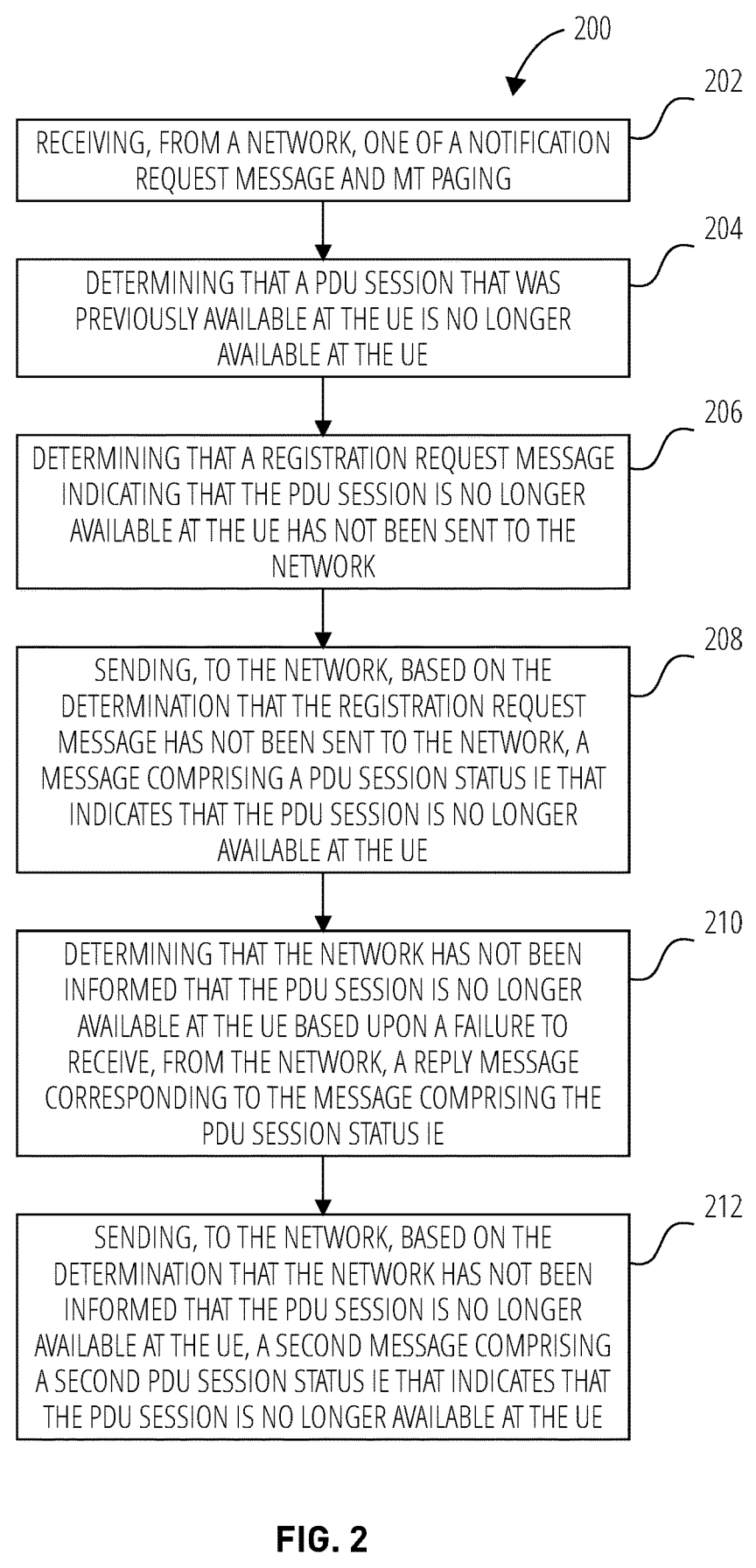

RECEIVING, FROM A NETWORK, ONE OF A NOTIFICATION REQUEST MESSAGE AND MT PAGING

204

DETERMINING THAT A PDU SESSION THAT WAS PREVIOUSLY AVAILABLE AT THE UE IS NO LONGER AVAILABLE AT THE UE

206

DETERMINING THAT A REGISTRATION REQUEST MESSAGE INDICATING THAT THE PDU SESSION IS NO LONGER AVAILABLE AT THE UE HAS NOT BEEN SENT TO THE NETWORK

208

SENDING, TO THE NETWORK, BASED ON THE DETERMINATION THAT THE REGISTRATION REQUEST MESSAGE HAS NOT BEEN SENT TO THE NETWORK, A MESSAGE COMPRISING A PDU SESSION STATUS IE THAT INDICATES THAT THE PDU SESSION IS NO LONGER AVAILABLE AT THE UE

210

DETERMINING THAT THE NETWORK HAS NOT BEEN INFORMED THAT THE PDU SESSION IS NO LONGER AVAILABLE AT THE UE BASED UPON A FAILURE TO RECEIVE, FROM THE NETWORK, A REPLY MESSAGE CORRESPONDING TO THE MESSAGE COMPRISING THE PDU SESSION STATUS IE

212

SENDING, TO THE NETWORK, BASED ON THE DETERMINATION THAT THE NETWORK HAS NOT BEEN INFORMED THAT THE PDU SESSION IS NO LONGER AVAILABLE AT THE UE, A SECOND MESSAGE COMPRISING A SECOND PDU SESSION STATUS IE THAT INDICATES THAT THE PDU SESSION IS NO LONGER AVAILABLE AT THE UE

FIG. 2

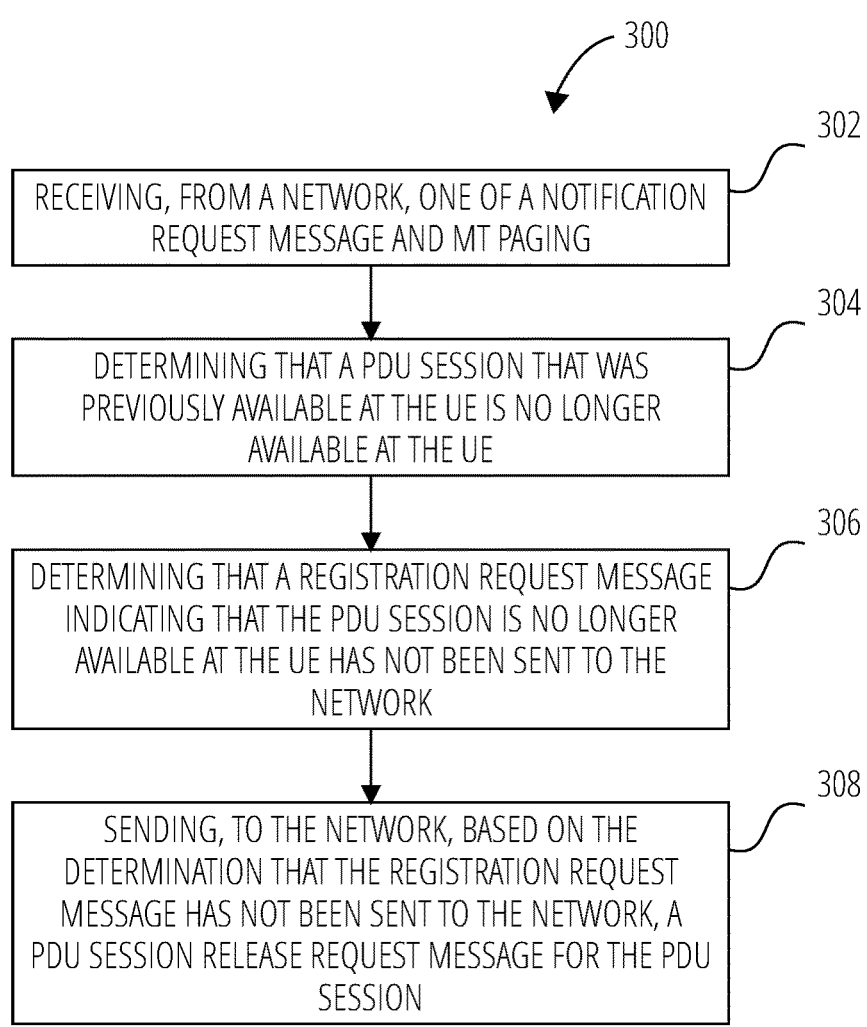

300

302

RECEIVING, FROM A NETWORK, ONE OF A NOTIFICATION
REQUEST MESSAGE AND MT PAGING

304

DETERMINING THAT A PDU SESSION THAT WAS
PREVIOUSLY AVAILABLE AT THE UE IS NO LONGER
AVAILABLE AT THE UE

306

DETERMINING THAT A REGISTRATION REQUEST MESSAGE
INDICATING THAT THE PDU SESSION IS NO LONGER
AVAILABLE AT THE UE HAS NOT BEEN SENT TO THE
NETWORK

308

SENDING, TO THE NETWORK, BASED ON THE
DETERMINATION THAT THE REGISTRATION REQUEST
MESSAGE HAS NOT BEEN SENT TO THE NETWORK, A
PDU SESSION RELEASE REQUEST MESSAGE FOR THE PDU
SESSION

FIG. 3

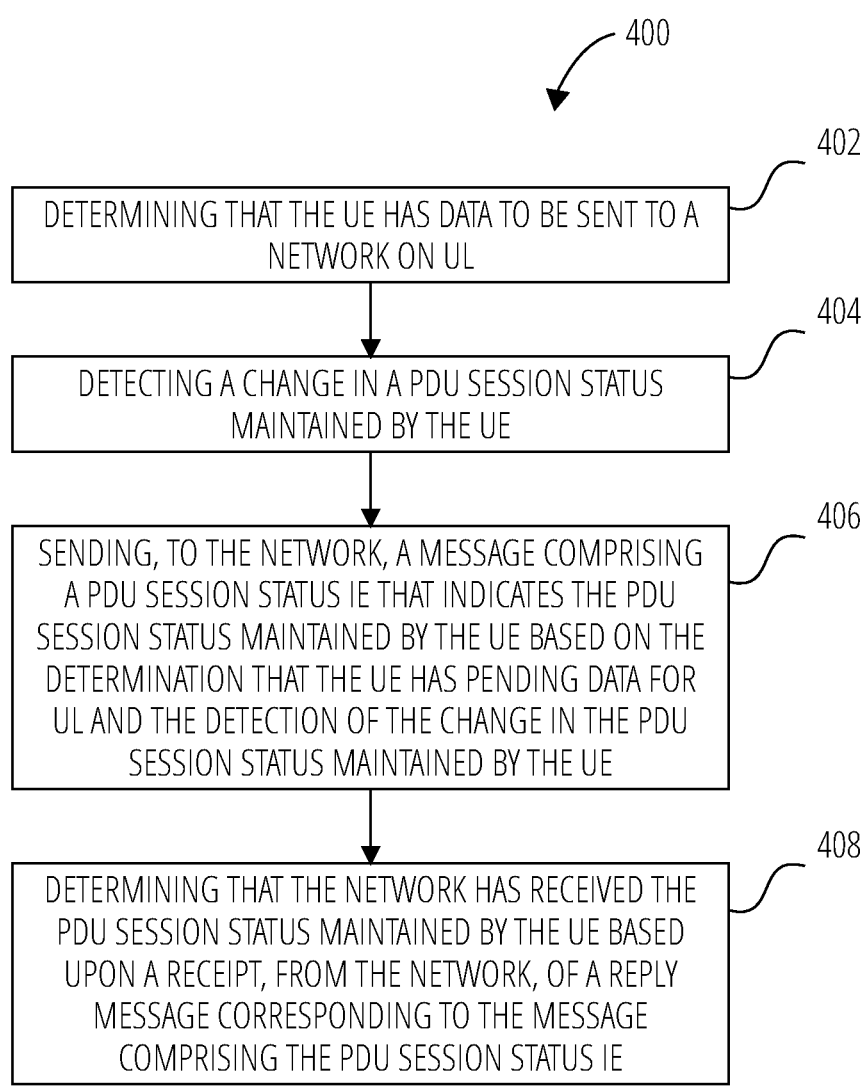

400

402

DETERMINING THAT THE UE HAS DATA TO BE SENT TO A NETWORK ON UL

404

DETECTING A CHANGE IN A PDU SESSION STATUS MAINTAINED BY THE UE

406

SENDING, TO THE NETWORK, A MESSAGE COMPRISING A PDU SESSION STATUS IE THAT INDICATES THE PDU SESSION STATUS MAINTAINED BY THE UE BASED ON THE DETERMINATION THAT THE UE HAS PENDING DATA FOR UL AND THE DETECTION OF THE CHANGE IN THE PDU SESSION STATUS MAINTAINED BY THE UE

408

DETERMINING THAT THE NETWORK HAS RECEIVED THE PDU SESSION STATUS MAINTAINED BY THE UE BASED UPON A RECEIPT, FROM THE NETWORK, OF A REPLY MESSAGE CORRESPONDING TO THE MESSAGE COMPRISING THE PDU SESSION STATUS IE

FIG. 4

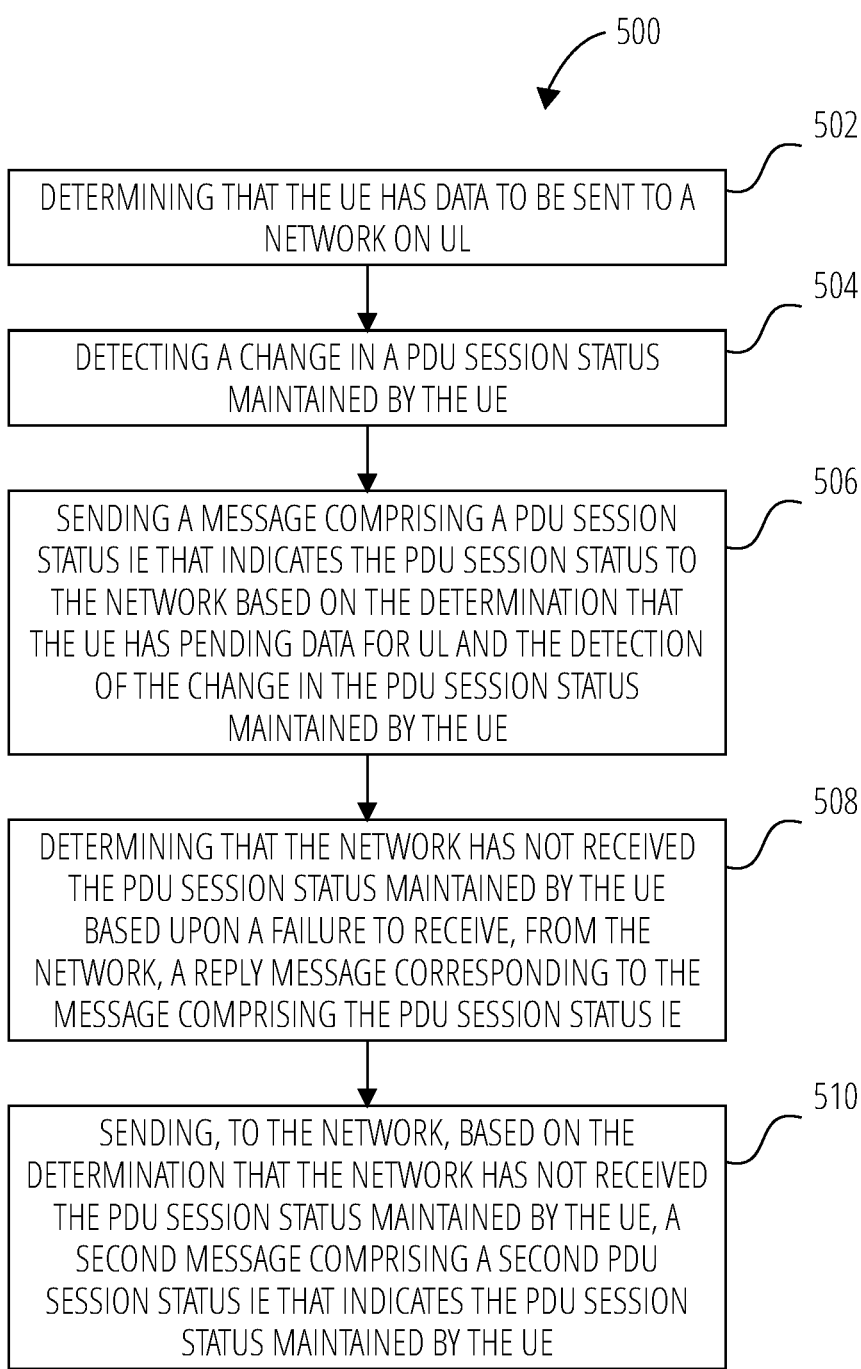

500

502
DETERMINING THAT THE UE HAS DATA TO BE SENT TO A NETWORK ON UL

504
DETECTING A CHANGE IN A PDU SESSION STATUS MAINTAINED BY THE UE

506
SENDING A MESSAGE COMPRISING A PDU SESSION STATUS IE THAT INDICATES THE PDU SESSION STATUS TO THE NETWORK BASED ON THE DETERMINATION THAT THE UE HAS PENDING DATA FOR UL AND THE DETECTION OF THE CHANGE IN THE PDU SESSION STATUS MAINTAINED BY THE UE

508
DETERMINING THAT THE NETWORK HAS NOT RECEIVED THE PDU SESSION STATUS MAINTAINED BY THE UE BASED UPON A FAILURE TO RECEIVE, FROM THE NETWORK, A REPLY MESSAGE CORRESPONDING TO THE MESSAGE COMPRISING THE PDU SESSION STATUS IE

510
SENDING, TO THE NETWORK, BASED ON THE DETERMINATION THAT THE NETWORK HAS NOT RECEIVED THE PDU SESSION STATUS MAINTAINED BY THE UE, A SECOND MESSAGE COMPRISING A SECOND PDU SESSION STATUS IE THAT INDICATES THE PDU SESSION STATUS MAINTAINED BY THE UE

FIG. 5

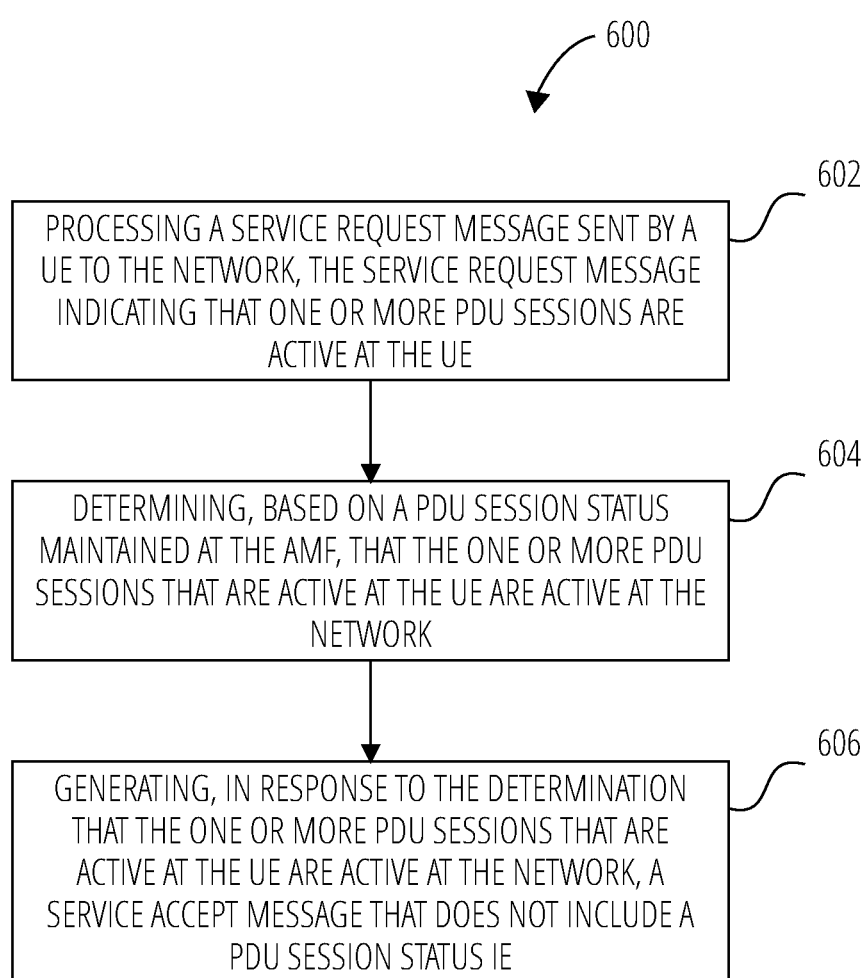

600

602
PROCESSING A SERVICE REQUEST MESSAGE SENT BY A UE TO THE NETWORK, THE SERVICE REQUEST MESSAGE INDICATING THAT ONE OR MORE PDU SESSIONS ARE ACTIVE AT THE UE

604
DETERMINING, BASED ON A PDU SESSION STATUS MAINTAINED AT THE AMF, THAT THE ONE OR MORE PDU SESSIONS THAT ARE ACTIVE AT THE UE ARE ACTIVE AT THE NETWORK

606
GENERATING, IN RESPONSE TO THE DETERMINATION THAT THE ONE OR MORE PDU SESSIONS THAT ARE ACTIVE AT THE UE ARE ACTIVE AT THE NETWORK, A SERVICE ACCEPT MESSAGE THAT DOES NOT INCLUDE A PDU SESSION STATUS IE

FIG. 6

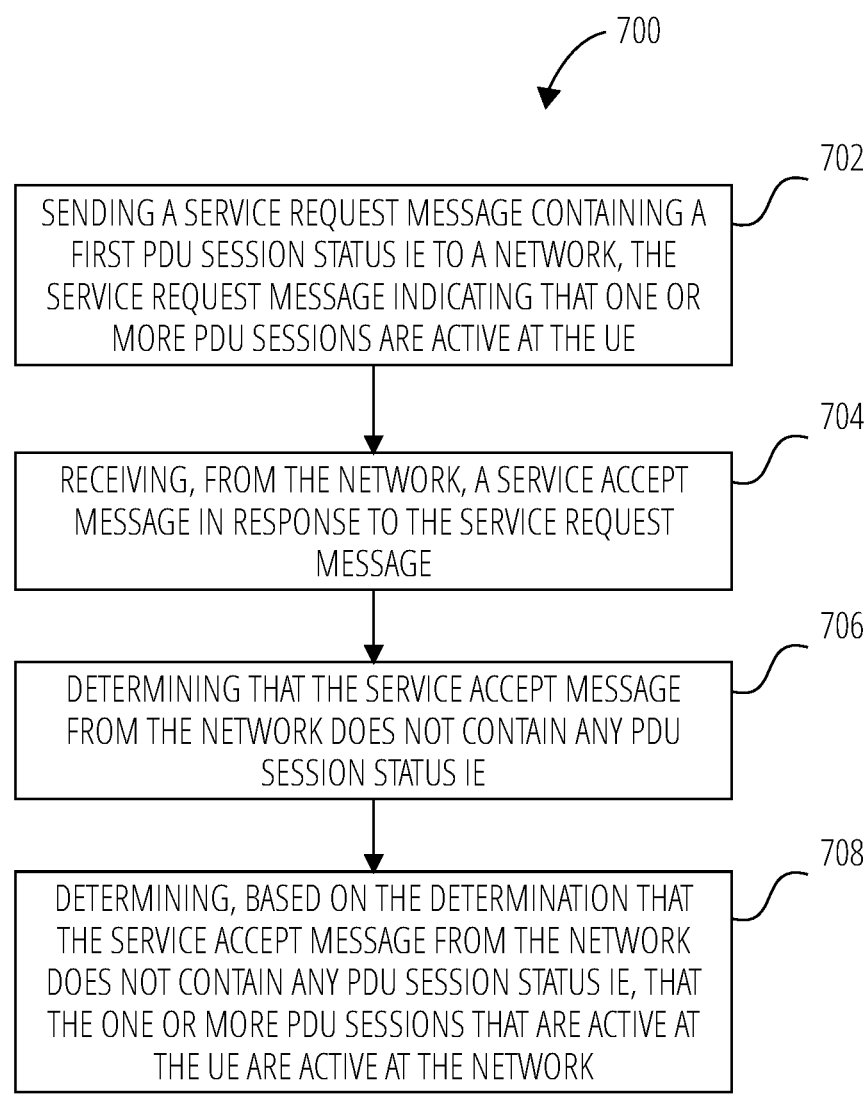

700

702

SENDING A SERVICE REQUEST MESSAGE CONTAINING A FIRST PDU SESSION STATUS IE TO A NETWORK, THE SERVICE REQUEST MESSAGE INDICATING THAT ONE OR MORE PDU SESSIONS ARE ACTIVE AT THE UE

704

RECEIVING, FROM THE NETWORK, A SERVICE ACCEPT MESSAGE IN RESPONSE TO THE SERVICE REQUEST MESSAGE

706

DETERMINING THAT THE SERVICE ACCEPT MESSAGE FROM THE NETWORK DOES NOT CONTAIN ANY PDU SESSION STATUS IE

708

DETERMINING, BASED ON THE DETERMINATION THAT THE SERVICE ACCEPT MESSAGE FROM THE NETWORK DOES NOT CONTAIN ANY PDU SESSION STATUS IE, THAT THE ONE OR MORE PDU SESSIONS THAT ARE ACTIVE AT THE UE ARE ACTIVE AT THE NETWORK

FIG. 7

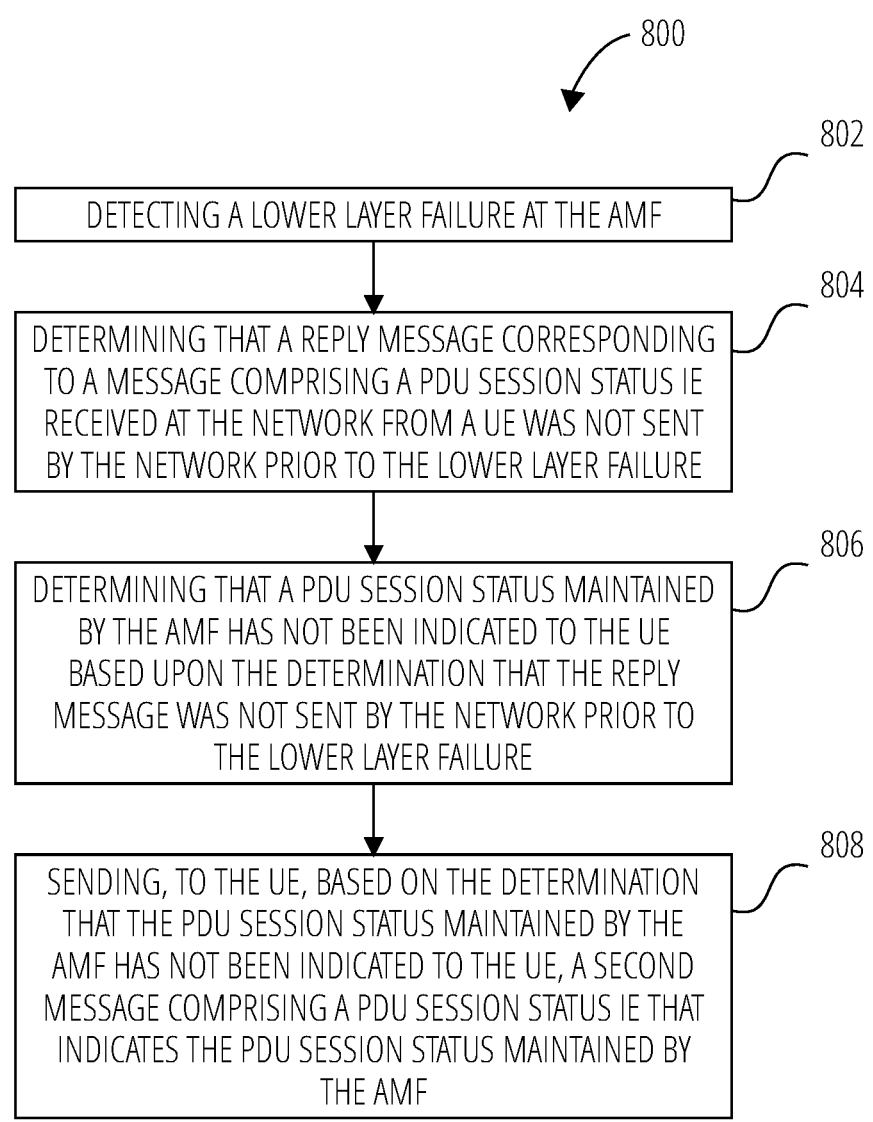

800

802

DETECTING A LOWER LAYER FAILURE AT THE AMF

804

DETERMINING THAT A REPLY MESSAGE CORRESPONDING TO A MESSAGE COMPRISING A PDU SESSION STATUS IE RECEIVED AT THE NETWORK FROM A UE WAS NOT SENT BY THE NETWORK PRIOR TO THE LOWER LAYER FAILURE

806

DETERMINING THAT A PDU SESSION STATUS MAINTAINED BY THE AMF HAS NOT BEEN INDICATED TO THE UE BASED UPON THE DETERMINATION THAT THE REPLY MESSAGE WAS NOT SENT BY THE NETWORK PRIOR TO THE LOWER LAYER FAILURE

808

SENDING, TO THE UE, BASED ON THE DETERMINATION THAT THE PDU SESSION STATUS MAINTAINED BY THE AMF HAS NOT BEEN INDICATED TO THE UE, A SECOND MESSAGE COMPRISING A PDU SESSION STATUS IE THAT INDICATES THE PDU SESSION STATUS MAINTAINED BY THE AMF

RECEIVING, FROM A NETWORK, MT PAGING

904

SENDING, IN RESPONSE TO THE MT PAGING, A SERVICE REQUEST MESSAGE COMPRISING A PDU SESSION STATUS IE THAT INDICATES THAT ONE OR MORE PDU SESSIONS ARE ACTIVE AT THE UE

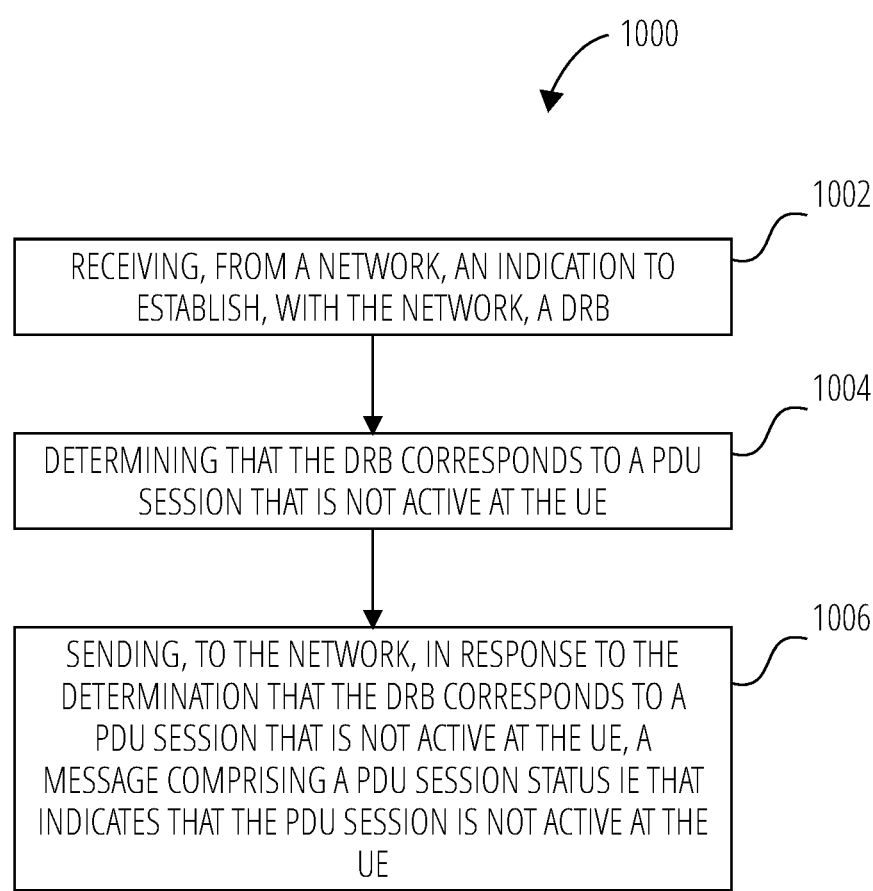

1000

RECEIVING, FROM A NETWORK, AN INDICATION TO ESTABLISH, WITH THE NETWORK, A DRB

1002

DETERMINING THAT THE DRB CORRESPONDS TO A PDU SESSION THAT IS NOT ACTIVE AT THE UE

1004

SENDING, TO THE NETWORK, IN RESPONSE TO THE DETERMINATION THAT THE DRB CORRESPONDS TO A PDU SESSION THAT IS NOT ACTIVE AT THE UE, A MESSAGE COMPRISING A PDU SESSION STATUS IE THAT INDICATES THAT THE PDU SESSION IS NOT ACTIVE AT THE UE

OPTIMIZING USE OF PDU SESSION STATUS IE

TECHNICAL FIELD

This application relates generally to wireless communication systems, including wireless communication systems that maintain protocol data unit (PDU) session synchronization between a user equipment (UE) and a network using messages that contain PDU session status information elements (IEs).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or a Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in FR1. Skilled persons will recognize these frequency ranges, which are provided by way of example, and may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1 illustrates a method of a UE, according to an embodiment.

FIG. 2 illustrates a method of a UE, according to an embodiment.

FIG. 3 illustrates a method of a UE, according to an embodiment.

FIG. 4 illustrates a method of a UE, according to an embodiment.

FIG. 5 illustrates a method of a UE, according to an embodiment.

FIG. 6 illustrates a method of an AMF of a network, according to an embodiment.

FIG. 7 illustrates a method of a UE, according to an embodiment.

FIG. 8 illustrates a method of an AMF of a network, according to an embodiment.

FIG. 10 illustrates a method of a UE, according to an embodiment.

DETAILED DESCRIPTION

Figure 9:
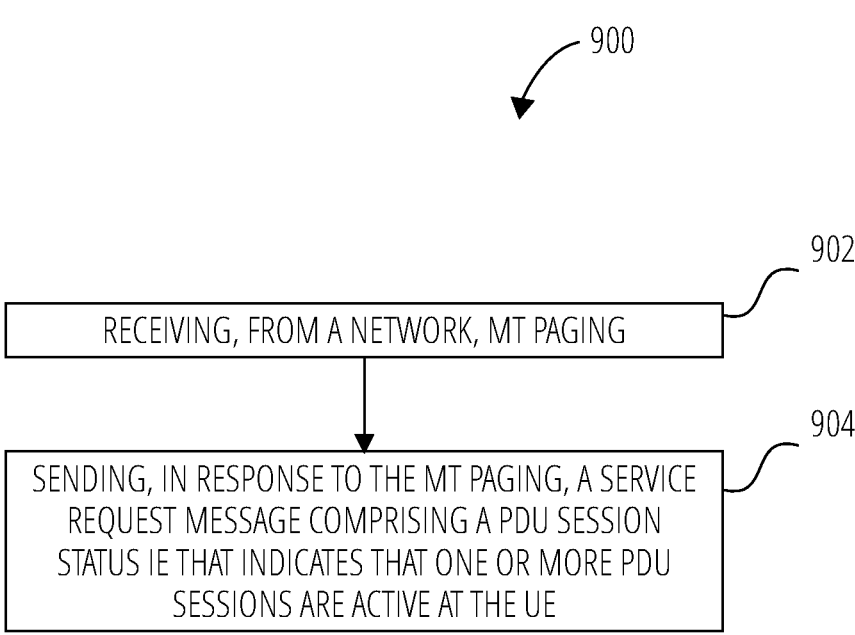
FIG. 9 illustrates a method of a UE, according to an embodiment.

A user equipment (UE) and a network may communicate between each other using one or more protocol data unit (PDU) sessions. A PDU session may be understood to comprise a logical connection (e.g., a data radio bearer (DRB)) between a UE and the network. Such PDU sessions may provide data transport for communicating externally to the network. In other words, the UE may communicate with the external entities using one or more PDUs with the network. A PDU session may be established according to a protocol that is used to communicate data to the external entity. For example, a PDU session may be typed to use according to IP packets, Ethernet frames, or some other type of transport arrangement. In some RATs (e.g., NR), it is possible to consider multiple simultaneous PDU sessions as between a UE and a network. These PDU sessions may include one or more active PDU sessions. An active PDU session may be a PDU session for which a context is being maintained at the relevant system entity (e.g., the UE and/or the network), and may correspond to a DRB. This DRB of the active PDU session can itself be in any of an active, suspended, or inactive state. Others of these PDU sessions considered as between a UE and a network may be thought of as inactive PDU sessions, wherein no DRBs are established and for which no PDU session context exists at the relevant system entity (e.g., the UE and/or the network).

In order for a PDU session to be used to transport data, the PDU session must be active at both the UE side and the network side (e.g., at an Access and Mobility Management Function (AMF) and Session Management Function (SMF) of the network). Accordingly, it may be useful for an entity of the wireless communication system to track the current PDU sessions that are currently active at such entity, and it may further be useful for this entity to communicate this information to another peer entity of the wireless communication system (e.g., from the UE to the AMF of the network or vice versa).

One way for an entity to communicate this information to a peer entity is by sending a PDU session status information element (IE) that describes a PDU session status of the sending entity (e.g., an indication of which PDU sessions are active and/or inactive at the sending entity). A PDU session status IE may be sent in some instances in, for example, a service request message from a UE to the network. A service request may be a message used by the UE to move into connected mode with the network and establish a new PDU session. It may also be used to establish a DRB of the PDU session and/or reactivate a suspended DRB of an already established PDU session between the UE and the network. The service request message may be a message of a service request procedure as defined in TS 23.502 (September 2020) (see generally section 4.2.3). The PDU session status IE in such a service request message reports to the network the PDU sessions that are active at the UE, so that the network can determine the PDU sessions that are active in the UE. Further, in some of these cases, the network may respond to the service request message with a service accept message or a service reject message that includes a PDU session status IE that reports to the UE the PDU sessions that are active at the network so that the UE can determine the PDU sessions that are active in the network. In some of these cases, this allows the UE to determine which PDU sessions should remain active at the UE and to release those PDU sessions locally which are not active at the network. In this way, both UE and network synchronize the PDU sessions' contexts.

A PDU session status IE may be sent, in other instances, in a registration request message from a UE to the network. The registration request message may be a message of a registration procedure as defined in TS 23.502 (September 2020) (see generally section 4.2.2). A registration request message may be a message used by the UE to attach or update a UE's location or other configuration changes to the network as described in TS 24.501 (section 5.5.1.2 and 5.5.1.3). The PDU session status IE in such a registration request message reports to the network the PDU sessions that are active at the UE, so that the network can activate the same PDU sessions. Further, in some of these cases, the network may respond to the registration request message with a registration accept message that includes a PDU session status IE that reports to the UE the PDU sessions that are active at the network so that the UE can ensure that it and the network are indeed synchronized.

Such PDU session status IEs may be used to resolve PDU session desynchronization (e.g., to resolve issues where the UE and the network do not have the same understanding as to which PDU sessions are active at the other entity). Desynchronization between the UE and the network can occur due to, for example, a radio link failure (RLF) between the UE and the network, for example, when a PDU session release procedure is ongoing or when the UE or the network locally release a PDU session when UE is not reachable by the network or when UE cannot establish connection with the network.

In one instance of such cases, a UE may have locally deactivated a PDU session and attempted to send a PDU session release request message indicating that this has occurred to the network. However, if an RLF between the UE and the network occurs near this time, it may be that the PDU session release request message is never successfully received at the network side. Accordingly, the network is not made aware that the UE has locally deactivated the PDU session and does not correspondingly deactivate the PDU session locally. In other words, the UE and the network are now out of PDU session synchronization. The (subsequent)

transmission of a message comprising a PDU session status IE by the UE to the network (e.g., once the RLF condition is resolved) may instead act to inform the network that the UE has deactivated the PDU session, allowing the UE and the network to resynchronize active PDU sessions.

Another analogous situation that may cause desynchronization may be where an RLF occurs as the network (e.g., an AMF) is trying to make an indication (e.g., of a confirmation of, or a change to) of its PDU session status to a UE. In similar fashion, a (subsequent) transmission of a message comprising a PDU session status IE by the network to the UE (e.g., once the RLF condition is resolved) may instead act to inform the UE of the confirmation and/or change, allowing the network and the UE to resynchronize as to active PDU sessions The sending of one or more PDU session status IEs can be resource intensive. For example, in some wireless communication systems, the sending of a PDU session status IE in a service request message or a registration request message may use up to four bytes of information in each such message. Further, a reply in a service accept message or a registration accept message from the network may also use up to four bytes of information in each such message. Additionally, in cases where the PDU session status IE is a non-clear text IE (such as, for example, when the UE has a valid security context), the PDU session status IE may be encrypted (which uses power and time), after which it may be as large as 16 bytes (which uses additional transmission resources). Further, the service request message may be frequently sent by the UE in some wireless communication systems, because it may be an optimal method to enter connected mode and establish a bearer for an already established PDU session. Still further, the service accept message may be frequently used when sending a short message service (SMS) message, location services (LCS) signaling, LTE positioning protocol (LPP) signaling, or session management (SM) signaling message when the UE is in idle mode.

Accordingly, such wireless communication systems can be further optimized by identifying situations where a message (such as a service request message, a service accept message, a registration request message, and/or a registration accept message) does (or does not) need to include a PDU session status IE (e.g., to help ensure PDU session synchronization), and by so configuring the elements of the wireless communication system (e.g., the UE, the AMF of the network, etc.) to function in cases where not every such message includes a PDU session status IE (e.g., in order to save resources within the wireless communication system, where possible).

In some cases, it may be that a service request message can be elected to be sent instead of another possible message (such as a registration request message). This may be because the use of a service request message may be less resource intensive than a use of the other message. Accordingly, wireless communication systems can be further optimized by being configured to use a service accept message instead of other message options, where possible.

The receipt at the UE of a mobile terminated (MT) page from the network or a notification request from the network may be one case where a UE may be configured to reply with the PDU session status IE (or not). Whether a reply is made (or not) may be determined based on other recent communications with the network. For example, if the UE determines that it has locally deactivated (or is in the process of locally deactivating) a PDU session, and that it has not (yet) been able to initiate a registration request message reporting this deactivation (or in-progress deactivation) to the network, then it may indicate that such PDU session is no longer active by placing a corresponding PDU session status IE indicating this information in a service request message or the registration request message that is responsive to the MT page or notification request. The network may then appropriately respond to the PDU session status IE. For example, an AMF may release PDU sessions corresponding to the deactivation (and/or in-progress deactivation) at the UE by communicating with an SMF. Further, the AMF may indicate to a base station to release any DRB(s) associated with such PDU sessions.

In other cases, a UE may receive an MT page or a notification request from the network and respond with a service request or registration request to the network without indicating in a PDU session status IE that one or more PDU sessions is being deactivated. In these cases, the UE may immediately follow up, at the end of the corresponding service request procedure or registration request procedure, with a PDU session release request message for each of the one or more PDU sessions (if this has not already been completed due to, for example, an RLF).

In other cases, where the UE determines that it has (already) sent a registration request message reporting the local deactivation of the PDU session prior to the receipt of the MT page or notification request, the UE may not include the PDU session status IE in the service request message or the registration request message (as applicable) that is responsive to the MT page or notification request.

FIG. 1 illustrates a method 100 of a UE, according to an embodiment. The method 100 includes receiving 102, from a network, one of a notification request message and MT paging.

The method 100 further includes determining 104 that a PDU session that was previously available at the UE is no longer available at the UE. In some cases, the determination that the PDU session is no longer available at the UE may be based upon a determination that the PDU session is not currently active at the UE. In some cases, the determination that the PDU session is no longer available at the UE may be based upon a determination that the PDU session is being deactivated at the UE.

The method 100 further includes determining 106 that a registration request message indicating that the PDU session is no longer available at the UE has not been sent to the network.

The method 100 further includes sending 108, to the network, based on the determination that the registration request message has not been sent to the network, a message comprising a PDU session status IE that indicates that the PDU session is no longer available at the UE. In some cases, the message comprising this PDU session status IE may be a service request message. In some cases, the message comprising this PDU session status IE may be the registration request message.

The method 100 further includes determining 110 that the network has been informed that the PDU session is no longer available at the UE based upon a receipt, from the network, of a reply message corresponding to the message comprising the PDU session status IE. The UE may wait to make the determination that the network has been so informed until the reply message is received at the UE. This may allow the UE to subsequently update the network with an additional indication that the PDU session is not available in the case (as described below in relation to the method 200) where the reply message is never received by the network (and thus the reply message is never sent to the UE). In some embodiments, the reply message may be a service accept message or a service reject message. In some embodiments, the reply message may be a registration accept message.

FIG. 2 illustrates a method 200 of a UE, according to an embodiment. The method 200 includes receiving 202 from a network, one of a notification request message and MT paging.

The method 200 further includes determining 204 that a PDU session that was previously available at the UE is no longer available at the UE. In some cases, the determination that the PDU session is no longer available at the UE may be based upon a determination that the PDU session is not currently active at the UE. In some cases, the determination that the PDU session is no longer available at the UE may be based upon a determination that the PDU session is being deactivated at the UE.

The method 200 further includes determining 206 that a registration request message indicating that the PDU session is no longer available at the UE has not been sent to the network.

The method 200 further includes sending 208, to the network, based on the determination that the registration request message has not been sent to the network, a message comprising a PDU session status IE that indicates that the PDU session is no longer available at the UE. In some cases, the message comprising this PDU session status IE may be a service request message. In some cases, the message comprising this PDU session status IE may be the registration request message.

The method 200 further includes determining 210 that the network has not been informed that the PDU session is no longer available at the UE based upon a failure to receive, from the network, a reply message corresponding to the message comprising the PDU session status IE.

The method 200 further includes sending 212, to the network, based on the determination that the network has not been informed that the PDU session is no longer available at the UE, a second message comprising a second PDU session status IE that indicates that the PDU session is no longer available at the UE.

FIG. 3 illustrates a method 300 of a UE, according to an embodiment. The method 300 includes receiving 302, from a network, one of a notification request message and MT paging.

The method 300 further includes determining 304 that a PDU session that was previously available at the UE is no longer available at the UE.

The method 300 further includes determining 306 that a registration request message indicating that the PDU session is no longer available at the UE has not been sent to the network.

The method 300 further includes sending, to the network, based on the determination that the registration request message has not been sent to the network, a PDU session release request message for the PDU session.

A detected change, at a UE, to the UE's PDU session status while pending uplink (UL) user data or UL control signaling exists at the UE mode may be one case where a UE may be configured to trigger a service request procedure by sending a service request message with a PDU session status IE, or to trigger a registration procedure by sending a registration request message with a PDU session status IE. In some cases involving a service request procedure, this may occur when the UE is in a 5GMM-REGISTERED-.NORMAL-SERVICE mode. In other cases involving a registration request procedure, this may occur when the UE is in a 5GMM-REGISTERED. UPDATE-NEEDED mode or a 5GMM-REGISTERED.ATTEMPTING-REGISTRA-TION-UPDATE mode.

In other cases, where there is no pending UL data or UL signaling at the UE (and/or where the UE is not in a 5GMM-REGISTERED.NORMAL-SERVICE mode, a 5GMM-REGISTERED.UPDATE-NEEDED mode, or a 5GMM-REGISTERED.ATTEMPTING-REGISTRATION-UPDATE mode) during a detected change in PDU session status at the UE, the UE may not be configured to react to the detected change in PDU session status by triggering a service request procedure by sending a service request message with a PDU session status IE, or by triggering a registration procedure by sending a registration request message with a PDU session status IE.

Checking for these conditions and sending the one of the service request message and the registration request message containing the PDU session status IE upon detecting a change in the PDU session status at the UE may be more optimal than passively waiting for a follow-up message (subsequent to the change in PDU session status) that happens to have the PDU session status IE to ensure synchronization between the UE and the network (e.g., checking for these conditions and sending a message upon detection may allow the network and the UE to more immediately be synchronized).

Further, while either a service request message or a registration request message can be sent upon the detection of the above-described conditions, to the extent that a service request message is used instead of a registration request message, this may be more efficient due to the increased size of the registration request message as compared to the service request message, and/or the increased size of a responsive registration accept message as compared to the service accept message.

It is contemplated that this functionality could be applied in many circumstances, including in relation to all conditions mentioned in TS 24.501 section 5.6.1.1 if such are applicable when a local PDU release occurs at the UE. For example, some such conditions may be a case where a UE has pending UL data and has deactivated a PDU session locally. Then, on regaining service, the UE can immediately initiate a service request procedure by sending a service request message with a PDU session status IE indicating that the PDU session is locally released (instead of using a registration request to do so). In another example, some such conditions may be where a UE has a pending emergency call and has deactivated a PDU session locally. In these cases, the UE may send a service request message with service type "emergency" and a PDU session status IE that indicates that the PDU session is inactive. Further examples of this case may include Emergency Service Fallback request pending methods.

FIG. 4 illustrates a method 400 of a UE, according to an embodiment. The method 400 includes determining 402 that the UE has data to be sent to a network on UL. This data could be user data or could be control signaling between the UE and the network.

The method 400 further includes detecting 404 a change in a PDU session status maintained by the UE.

The method 400 further includes sending 406, to the network, a message comprising a PDU session status IE that indicates the PDU session status maintained by the UE based on the determination that the UE has pending data for UL and the detection of the change in the PDU session status maintained by the UE. In some embodiments, the message comprising the PDU session status IE may be a service request message. In some embodiments, the message comprising the PDU session status IE may be a registration request message.

The method 400 further includes determining 408 that the network has received the PDU session status maintained by the UE based upon a receipt, from the network, of a reply message corresponding to the message comprising the PDU session status IE. The UE may wait to make the determination that the network has been so informed until the reply message is received at the UE. This may allow the UE to subsequently update the network with an additional indication that the PDU session is not available in the case (as described below in relation to the method 500) where the reply message is never received by the network (and thus the reply message is never sent to the UE). In some embodiments, the reply message may be a service accept message or a service reject message. In some embodiments, the reply message may be a registration accept message.

FIG. 5 illustrates a method 500 of a UE, according to an embodiment. The method 500 includes determining 502 that the UE has data to be sent to a network on UL. This data could be user data or could be control signaling between the UE and the network.

The method 500 further includes detecting 504 a change in a PDU session status maintained by the UE.

The method 500 further includes sending 506 a message comprising a PDU session status IE that indicates the PDU session status to the network based on the determination that the UE has pending data for UL and the detection of the change in the PDU session status maintained by the UE. In some embodiments, the message comprising the PDU session status IE may be a service request message. In some embodiments, the message comprising the PDU session status IE may be a registration request message.

The method 500 further includes determining 508 that the network has not received the PDU session status maintained by the UE based upon a failure to receive, from the network, a reply message corresponding to the message comprising the PDU session status IE.

The method 500 further includes sending 510, to the network, based on the determination that the network has not received the PDU session status maintained by the UE, a second message comprising a second PDU session status IE that indicates the PDU session status maintained by the UE.

A service request sent by a UE to the network may be processed at, for example, an AMF of the network. It may be that during this processing, the AMF determines that the PDU session(s) active at the UE (as represented in a PDU session status IE in the service request) is/are active at the network. Accordingly, the AMF may be configured to send, to the UE, in response to the service request message, a service accept message (or a service reject message) that does not contain a PDU session status IE. The UE may be configured to determine, based on the lack of a PDU session status IE in the service accept message (or the service reject message), that the PDU session(s) active at the UE is/are active at the network and/or that the PDU session(s) inactive at the UE is/are inactive at the network. In this manner, synchronization can be ensured at the UE and the AMF without the AMF sending a PDU session status IE (saving the attendant resource costs described above).

FIG. 6 illustrates a method 600 of an AMF of a network, according to an embodiment. The method 600 includes processing 602 a service request message sent by a UE to the network, the service request message indicating that one or more PDU sessions are active at the UE.

The method 600 further includes determining 604, based on a PDU session status maintained at the AMF, that the one or more PDU sessions that are active at the UE are active at the network.

The method 600 further includes generating 606, in response to the determination that the one or more PDU sessions that are active at the UE are active at the network, a service accept message that does not include a PDU session status IE.

FIG. 7 illustrates a method 700 of a UE, according to an embodiment. The method 700 includes sending 702 a service request message containing a first PDU session status IE to a network, the service request message indicating that one or more PDU sessions are active at the UE.

The method 700 further includes receiving 704, from the network, a service accept message in response to the service request message.

The method 700 further includes determining 706 that the service accept message from the network does not contain any PDU session status IE.

The method 700 further includes determining 708, based on the determination that the service accept message from the network does not contain any PDU session status 1E, that the one or more PDU sessions that are active at the UE are active at the network.

In some cases, an entity of the wireless communication system (e.g., a UE or an AMF of a network) may need to ensure that a PDU session status is not considered to have been indicated to a peer entity (e.g., a UE or an AMF of a network) until certain messaging occurs successfully. In cases where this cannot be confirmed, a subsequent update to the peer entity using a message containing the PDU session status of the entity may be (later) used to achieve synchronization.

For example, a UE may not determine that a PDU session status of the UE has been indicated to an AMF through the sending of a service request message containing a PDU session status IE by the UE until a service accept message or a service reject message responsive to the service request message is received at the UE. As another example, a UE may not determine that a PDU session status of the UE has been indicated to an AMF through the sending of a registration request message until a registration accept message responsive to the registration request message is received at the UE. The failure to receive such responsive messaging (e.g., in either case described above) may allow the UE to determine that the PDU session status at the UE has not been indicated to the AMF. This determination may ultimately result with the UE subsequently updating the network with a (later) message including a PDU session status IE indicating the PDU session status at the UE at a later time. Examples of this behavior from a UE perspective have been presented in relation to the method 200 and the method 500, described above.

As another example, an AMF may determine that an indication regarding a PDU session status maintained by the AMF has not been made to a UE in the case where the AMF detects a lower layer failure (e.g., a failure reported by the Access Stratum (AS) to the Non-access Stratum (NAS) that cannot be corrected on AS level, meaning that NAS signaling connection is not available) before a service accept message or a service reject message making such an indication has been sent to the UE in response to a service request message of a service request procedure initiated by the UE. As another example, the AMF may determine that a PDU session status of the AMF has not been indicated to the UE in the case where the AMF detects a lower layer failure before a registration accept message has been sent to the UE in response to a registration request message of a registration procedure initiated by the UE. This determination may ultimately result with the AMF subsequently updating the UE with a PDU session status IE indicating the PDU session status at the AMF at a later time (e.g., after the lower layer failure is resolved). Note that in these cases, it may be that the sending of a service accept message, a service reject message, or a registration accept message makes an indication regarding a PDU session status maintained by the AMF even without including a PDU session status IE (e.g., by simply being responsive to a message received from the UE, in the manner described above).

FIG. 8 illustrates a method 800 of an AMF of a network, according to an embodiment. The method 800 includes detecting 802 a lower layer failure at the AMF.

The method 800 further includes determining 804 that a reply message corresponding to a message comprising a PDU session status IE received at the network from a UE was not sent by the network prior to the lower layer failure.

The method 800 further includes determining 806 that a PDU session status maintained by the AMF has not been indicated to the UE based upon the determination that the reply message was not sent by the network prior to the lower layer failure.

The method 800 further includes sending 808, to the UE, based on the determination that the PDU session status maintained by the AMF has not been indicated to the UE, a second message comprising a PDU session status IE that indicates the PDU session status maintained by the AMF.

For some wireless communication systems, it may be determined that it is desirable for the UE to respond to every MT page from the network with a service request that includes a PDU session status IE, so that the network is made aware of this information in all such cases. This may be helpful in resolving cases where, for example, a PDU session is active at the network but is not active at the UE and the network triggers a MT page attempting to establish bearers within such a PDU session.

FIG. 9 illustrates a method 900 of a UE, according to an embodiment. The method 900 includes receiving 902, from a network, MT paging.

The method 900 further includes sending 904, in response to the MT paging, a service request message comprising a PDU session status IE that indicates that one or more PDU sessions are active at the UE.

For some wireless communication systems, it may be possible for a UE to be in a 5GMM-CONNECTED mode while having a radio resource control (RRC) Inactive indication/mode (meaning that a data radio bearer (DRB) corresponding to a PDU session is inactive). This may correspond to an example where the UE has a first DRB that is allocated at the UE and is active, corresponding to a first (active) PDU session. Later, due to no data packet exchange between the UE and network for this first PDU session, the gNB decides to suspend the DRB. In this case, the UE enters an RRC-inactive state (e.g., it has an active PDU but the corresponding DRB is suspended).

In these cases, if the network is not aware that a second PDU session is inactive at the UE, it may attempt to establish a DRB of the second PDU session (which may also correspond to a PDU session that is active at the network side) for use in data transport to the UE. In this case, the UE may respond to this attempt by replying with a message containing a PDU session status IE indicating the active and inactive PDU sessions at the UE in order to synchronize the PDU session status between the UE and the network, thereby informing the network that the second PDU session is inactive at the UE side. In some cases, this may be a service request message. In other cases, the UE may alternatively send a registration request message with the PDU session status IE instead of sending a service request message containing the PDU session status IE in a service request message. In other words, the UE does not send a service request message comprising the PDU session status IE in response to a determination that the DRB of the second PDU session corresponds to a PDU session that is not active at the UE.

FIG. 10 illustrates a method 1000 of a UE, according to an embodiment. The method 1000 includes receiving 1002, from a network, an indication to establish, with the network, a DRB.

The method 1000 further includes determining 1004 that the DRB corresponds to a PDU session that is not active at the UE.

The method 1000 further includes sending 1006, to the network, in response to the determination that the DRB corresponds to a PDU session that is not active at the UE, a message comprising a PDU session status IE that indicates that the PDU session is not active at the UE. In some cases, this message may be a service request message. In other cases, this message may be a registration request message. In cases where a registration request message is used, the UE may not send a service request message comprising the PDU session status IE in response to the determination that the DRB of the PDU session corresponds to a PDU session that is not active at the UE.

The method 1000 may be performed when the UE is in a 5GMM-CONNECTED mode and/or when the UE has an RRC inactive indication.

Various scenarios where one or more of the above-described methods may be used will now be presented. These scenarios are given by way of example and not by way of limitation. These scenarios may apply in, for example, wireless communication systems that comprise 5G NR systems.

Scenario #1

In a first scenario, a UE may need to release a PDU session in order to request an emergency PDU session. In this case, the UE may perform either a local release of a PDU session or release a PDU session via explicit signaling with the network. In the case of the UE performing a local release, the UE may then either initiate a service request procedure or initiate a registration procedure.

In the case of the service request procedure, if the UE is in 5GMM-REGISTERED.NORMAL-SERVICE mode for the current access and conditions to trigger a service request message are applicable, then the UE may include the PDU session status IE in the service request message of the service request procedure. In other cases involving the service request procedure, if the UE receives a MT page or a notification request for the current access type while in the act of processing a PDU session release procedure, the UE may include a PDU session status IE in a service request message in response to the MT page or notification request. In some such cases involving the service request procedure, the PDU session status IE of the service request message may indicate that the PDU session is inactive.

In other cases involving the service request procedure, the PDU session status IE of the service request message may not indicate that the PDU session is inactive, but a follow up PDU session release request message may be sent after the completion of the service request procedure in order to cause the release of the PDU session at the network (and a T3582 timer is then stopped). This may be applicable in the case where the local release at the UE was pending, but not yet complete.

In the case of the registration procedure, such a registration procedure may provide a mobility and periodic registration update to the network, and may indicate to the network the PDU session status IE in a registration request message.

Scenario #2

In a second scenario, an abnormal case may be identified at the UE. One such abnormal case in certain wireless communication systems may be the expiry of a T3582 timer. The expiry of the T3582 time may indicate a failure to receive, at a UE, from the network, a response to a PDU session release request message triggered by the UE.

Upon the first expiry of the T3582 timer, the UE may retransmit the PDU session release request message and restart the T3582 timer. This retransmission may be repeated four times. Upon the fifth expiry of the T3582 timer, the UE may abort the procedure, release an allocated procedure transaction identity (PTI), and perform a local release of the PDU session. The UE may then either initiate a service request procedure or initiate a registration procedure.

In the case of the service request procedure, if the UE is in 5GMM-REGISTERED.NORMAL-SERVICE mode for the current access and conditions to trigger a service request message are applicable, then the UE may include the PDU session status IE in the service request message of the service request procedure. In other cases involving the service request procedure, if the UE receives a MT page or a notification request for the current access type while in the act of processing a PDU session release procedure, the UE may include a PDU session status IE in a service request message in response to the MT page or notification request.

In the case of the registration procedure, such a registration procedure may provide a mobility and periodic registration update to the network, and may indicate to the network the PDU session status IE in a registration request message.

Scenario #3

In a third scenario, a service request message according to a service request procedure may be sent by the UE to the network. Such a service request message may contain a PDU session status IE, which may indicate the single access PDU session(s) not in 5GSM state PDU SESSION INACTIVE in the UE associated with the access type the service request message is sent over, and the multi-access (MA) PDU session(s) not in 5GSM state PDU SESSION INACTIVE and having user plane resources established in the UE on the access type the service request message is sent over.

In some of these scenarios, the PDU session status IE may be included in the service request message of the service request procedure when the UE needs to indicate PDU session status(es) to the network after performing a local release of PDU session(s).

Scenario #4

In a fourth scenario, an abnormal case may be identified at the network. One such abnormal case may be a lower layer failure. In these cases, if the lower layer failure occurs before a service reject message has been sent to the UE (e.g., in response to a service request message sent by the UE in certain cases), or if the lower layer failure occurs before the service request procedure has been completed by the AMF of the network, or if the lower layer failure occurs before the PDU session release procedure initiated by network is successfully completed, the AMF enters and/or stays in 5GMM-IDLE mode and determines that the state of the PDU session status synchronization between the network and the UE remains pending. This determination may ultimately result with the network subsequently updating the UE with a message including a PDU session status IE indicating the PDU session status at the AMF at a later time.

Scenario #5

In a fifth scenario, in relation to a service request procedure which is to be accepted by a network, an AMF of the network may need to initiate PDU session status synchronization or a PDU session status IE may have been included in a service request message from the UE. In the case of the service request message from the UE, it may be that the AMF detects that the PDU session status at the AMF is not the same as the PDU session status reported in the PDU session status IE from the service request message or the PDU session release procedure initiated by network is not completed successfully. In this case, the AMF may include a PDU session status IE in a service accept message to be sent to the UE to indicate which single access PDU session associated with the access type the service accept message is sent over are not in 5GM state PDU SESSION INACTIVE in the AMF, and to further indicate which MA PDU sessions are not in 5GSM state PDU SESSION INACTIVE and having user plane resources established in the AMF on the access type the service accept message is sent over.

Scenario #6

In a sixth scenario, in relation to a service request procedure which is not to be accepted by a network, an AMF of the network may need to initiate PDU session status synchronization or a PDU session status IE may have been included in a service request message from the UE. In the case of the service request message from the UE, it may be that the AMF detects that the PDU session status at the AMF is not the same as the PDU session status reported in the PDU session status IE from the service request message. In this case, the AMF may include a PDU session status IE in a service reject message to indicate which PDU sessions associated with the access type the service reject message is sent over are active in the AMF. Alternatively, if the PDU session status IE sent by UE in a registration request message or a service request message indicates that the same set of PDU sessions are active at the network side, then the AMF may decide not to provide the PDU session status IE in service reject message.

Scenario #7

In a seventh scenario, if the UE is in a 5GMM-REGISTERED.NO-CELL-AVAILABLE state 5GMM-REGISTERED.PLMN-SEARCH mode, 5GMM-REGISTERED.LIMITED-SERVICE mode or 5GMM-REGISTERED.UPDATE-NEEDED mode over 3GPP access, the UE may respond with a notification response message indicating a failure to re-establish the user-plane resources of PDU session(s).

Further, this notification response message may include a PDU session status IE if the UE has locally released any PDU session(s), with the PDU session status IE indicating the single access PDU session(s) not in 5GMM state PDU SESSION INACTIVE in the UE associated with the 3GPP access type and the MA PDU session(s) not in 5GSM state PDU SESSION INACTIVE in the UE and having user plane resources established associated with the 3GPP access type. This PDU session status IE may not be included in cases where the UE has not locally released any PDU session(s), where the network has already been informed of such locally released PDU session(s).

Figure 11:
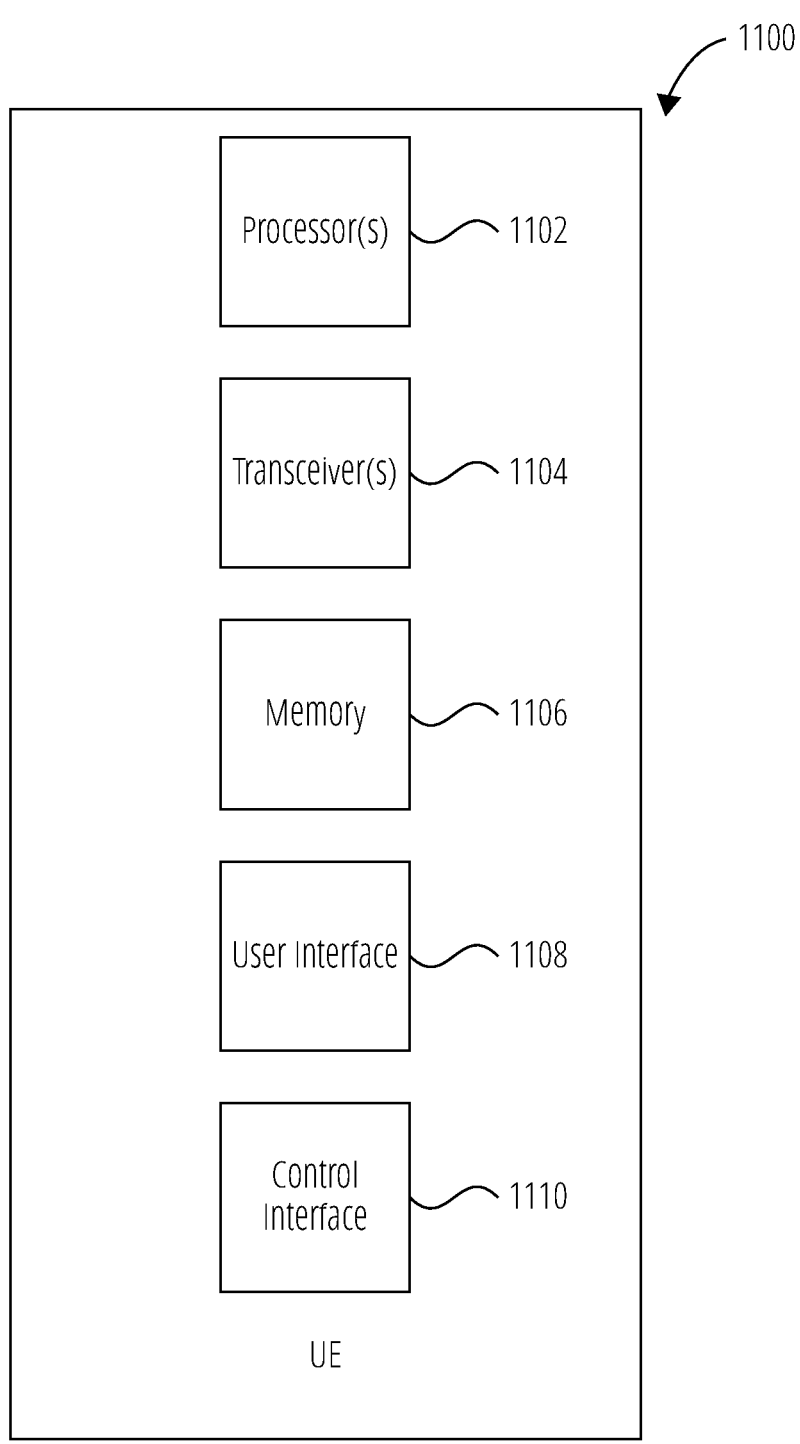
FIG. 11 illustrates a UE in accordance with one embodiment.

FIG. 11 is a block diagram of an example UE 1100 configurable according to various embodiments of the present disclosure, including by execution of instructions on a computer-readable medium that correspond to any of the example methods and/or procedures described herein. The UE 1100 comprises one or more processor 1102, transceiver 1104, memory 1106, user interface 1108, and control interface 1110.

The one or more processor 1102 may include, for example, an application processor, an audio digital signal processor, a central processing unit, and/or one or more baseband processors. Each of the one or more processor 1102 may include internal memory and/or may include interface(s) to communication with external memory (including the memory 1106). The internal or external memory can store software code, programs, and/or instructions for execution by the one or more processor 1102 to configure and/or facilitate the UE 1100 to perform various operations, including operations described herein. For example, execution of the instructions can configure the UE 1100 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 1104, user interface 1108, and/or control interface 1110. As another example, the one or more processor 1102 may execute program code stored in the memory 1106 or other memory that corresponds to MAC, RLC, PDCP, and RRC layer protocols standardized by 3GPP (e.g., for NR and/or LTE). As a further example, the processor 1102 may execute program code stored in the memory 1106 or other memory that, together with the one or more transceiver 1104, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 1106 may comprise memory area for the one or more processor 1102 to store variables used in protocols, configuration, control, and other functions of the UE 1100, including operations corresponding to, or comprising, any of the example methods and/or procedures described herein. Moreover, the memory 1106 may comprise non-volatile memory (e.g., flash memory), volatile memory (e.g., static or dynamic RAM), or a combination thereof. Furthermore, the memory 1106 may interface with a memory slot by which removable memory cards in one or more formats (e.g., SD Card, Memory Stick, Compact Flash, etc.) can be inserted and removed.

The one or more transceiver 1104 may include radio-frequency transmitter and/or receiver circuitry that facilitates the UE 1100 to communicate with other equipment supporting like wireless communication standards and/or protocols. For example, the one or more transceiver 1104 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 1102. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 1104 includes a transmitter and a receiver that enable UE 1100 to communicate with various 5G/NR networks according to various protocols and/or methods proposed for standardization by 3 GPP and/or other standards bodies. For example, such functionality can operate cooperatively with the one or more processor 1102 to implement a PHY layer based on OFDM, OFDMA, and/or SC-FDMA technologies, such as described herein with respect to other figures.

The user interface 1108 may take various forms depending on particular embodiments, or can be absent from the UE 1100. In some embodiments, the user interface 1108 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1100 may comprise a tablet computing device including a larger touchscreen display. In such embodiments, one or more of the mechanical features of the user interface 1108 may be replaced by comparable or functionally equivalent virtual user interface features (e.g., virtual keypad, virtual buttons, etc.) implemented using the touchscreen display, as familiar to persons of ordinary skill in the art. In other embodiments, the UE 1100 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 1100 having a touch screen display are capable of receiving user inputs, such as inputs related to exemplary methods and/or procedures described herein or otherwise known to persons of ordinary skill in the art.

In some exemplary embodiments of the present disclosure, the UE 1100 may include an orientation sensor, which can be used in various ways by features and functions of the UE 1100. For example, the UE 1100 can use outputs of the orientation sensor to determine when a user has changed the physical orientation of the UE 1100's touch screen display. An indication signal from the orientation sensor can be available to any application program executing on the UE 1100, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 1110 may take various forms depending on particular embodiments. For example, the control interface 1110 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1360 can comprise an IEEE 802.3 Ethernet interface such as described above. In some embodiments of the present disclosure, the control interface 1110 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1100 may include more functionality than is shown in FIG. 11 including, for example, a video and/or still-image camera, microphone, media player and/or recorder, etc. Moreover, the one or more transceiver 1104 may include circuitry for communication using additional radio-frequency communication standards including Bluetooth, GPS, and/or others. Moreover, the one or more processor 1102 may execute software code stored in the memory 1106 to control such additional functionality. For example, directional velocity and/or position estimates output from a GPS receiver can be available to any application program executing on the UE 1100, including various exemplary methods and/or computer-readable media according to various exemplary embodiments of the present disclosure.

Figure 12:
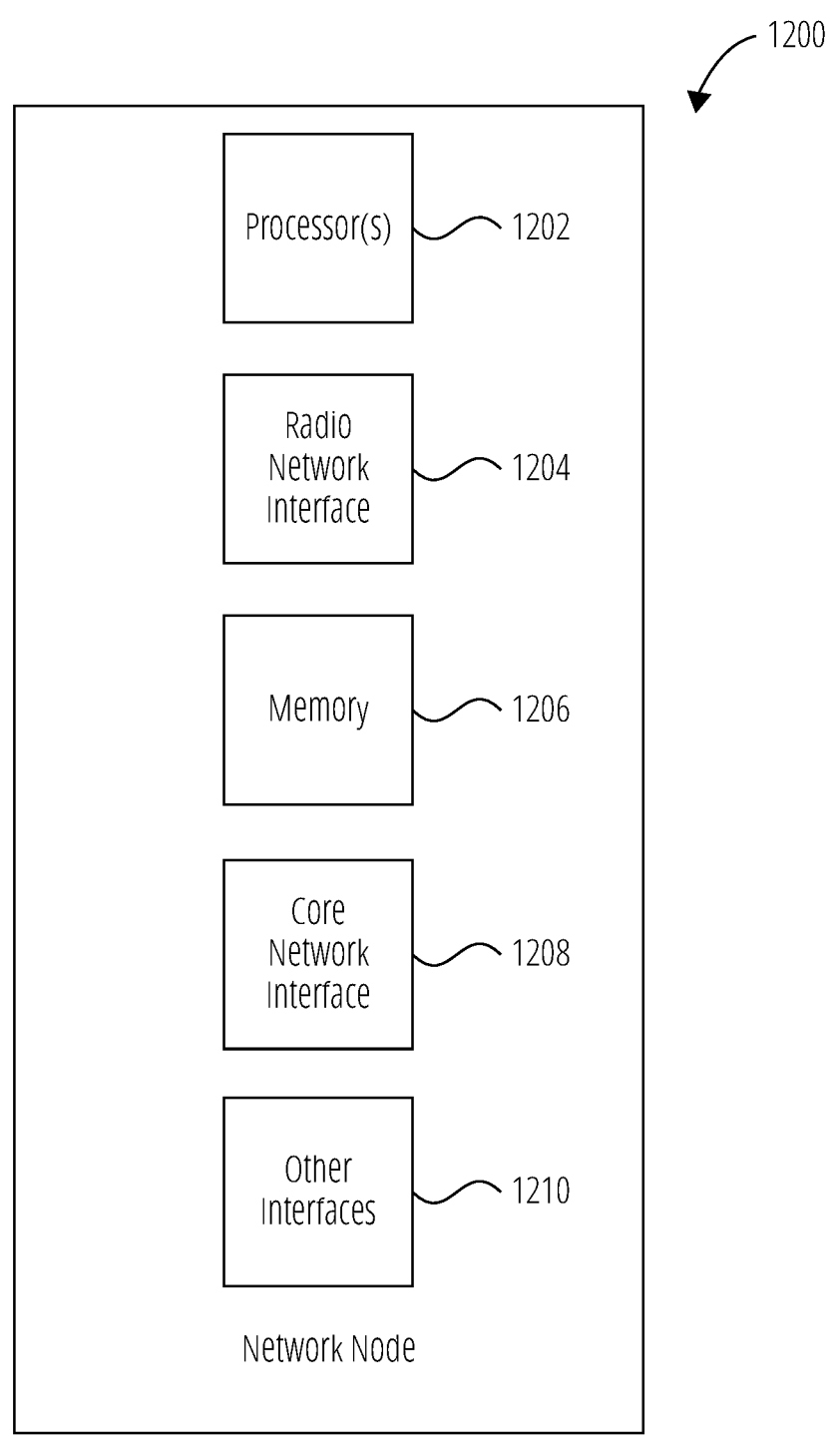
FIG. 12 illustrates a network node in accordance with one embodiment.

FIG. 12 is a block diagram of an example network node 1200 configurable according to various embodiments of the present disclosure, including by execution of instructions on a computer-readable medium that correspond to any of the example methods and/or procedures described herein.

The network node 1200 includes a one or more processor 1202, a radio network interface 1204, a memory 1206, a core network interface 1208, and other interfaces 1210. The network node 1200 may comprise, for example, a base station, eNB, gNB, access node, or component thereof.

The one or more processor 1202 may include any type of processor or processing circuitry and may be configured to perform any of the methods or procedures disclosed herein. The memory 1206 may store software code, programs, and/or instructions executed by the one or more processor 1202 to configure the network node 1200 to perform various operations, including operations described herein. For example, execution of such stored instructions can configure the network node 1200 to communicate with one or more other devices using protocols according to various embodiments of the present disclosure, including one or more methods and/or procedures discussed above. Furthermore, execution of such stored instructions can also configure and/or facilitate the network node 1200 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 1204 and the core network interface 1208. By way of example and without limitation, the core network interface 1208 comprise an S1 interface and the radio network interface 1204 may comprise a Uu interface, as standardized by 3GPP. The memory 1206 may also store variables used in protocols, configuration, control, and other functions of the network node 1200. As such, the memory 1206 may comprise non-volatile memory (e.g., flash memory, hard disk, etc.), volatile memory (e.g., static or dynamic RAM), network-based (e.g., "cloud") storage, or a combination thereof.

The radio network interface 1204 may include transmitters, receivers, signal processors, ASICs, antennas, beamforming units, and other circuitry that enables network node 1200 to communicate with other equipment such as, in some embodiments, a plurality of compatible user equipment (UE). In some embodiments, the network node 1200 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 1204 may include a PHY layer based on OFDM, OFDMA, and/or SC-FDMA technologies. In some embodiments, the functionality of such a PHY layer can be provided cooperatively by the radio network interface 1204 and the one or more processor 1202.

The core network interface 1208 may include transmitters, receivers, and other circuitry that enables the network node 1200 to communicate with other equipment in a core network such as, in some embodiments, circuit-switched (CS) and/or packet-switched Core (PS) networks. In some embodiments, the core network interface 1208 may include the S1 interface standardized by 3GPP. In some embodiments, the core network interface 1208 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 1208 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 1210 may include transmitters, receivers, and other circuitry that enables the network node 1200 to communicate with external networks, computers, databases, and the like for purposes of operations, administration, and maintenance of the network node 1200 or other network equipment operably connected thereto.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 13:
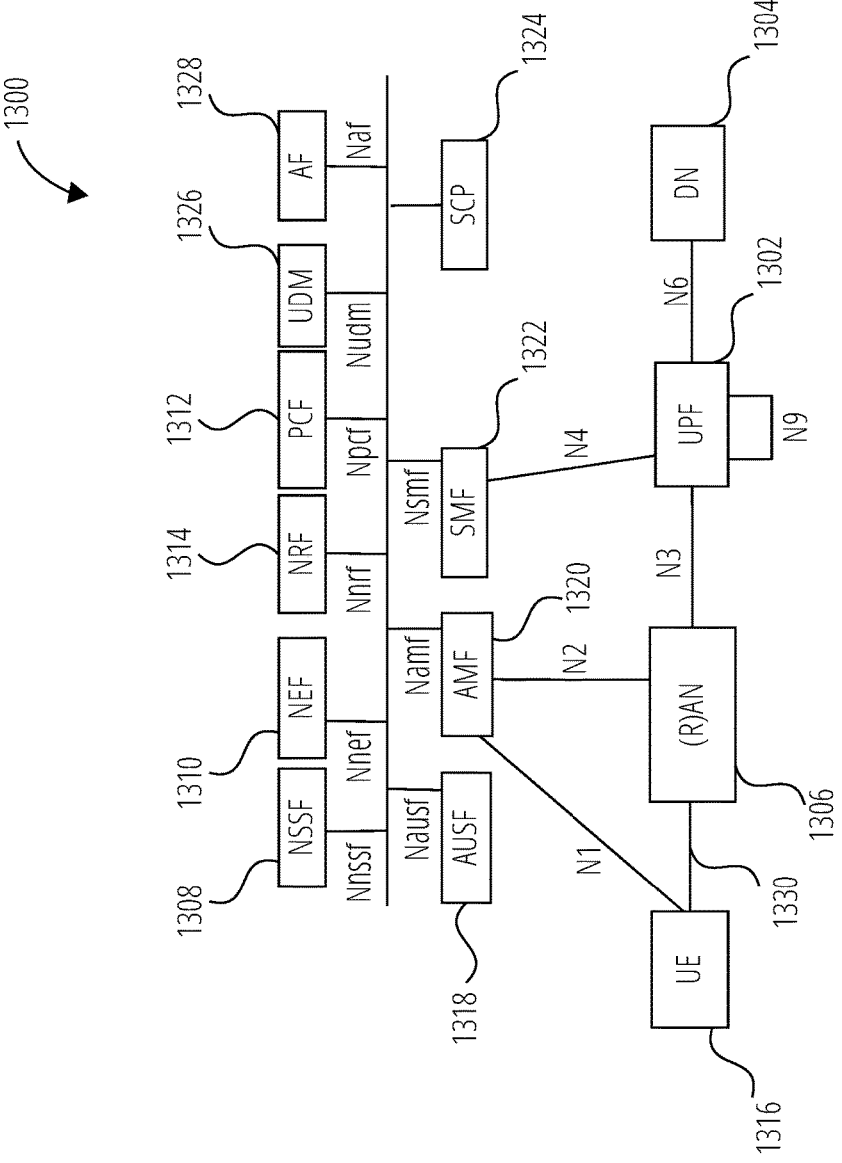
FIG. 13 illustrates an example of a service based architecture in accordance with certain embodiments.

FIG. 13 illustrates a service based architecture 1300 in 5GS according to one embodiment. As described in 3GPP TS 23.501, the service based architecture 1300 comprises NFs such as an NSSF 1308, a NEF 1310, an NRF 1314, a PCF 1312, a UDM 1326, an AUSF 1318, an AMF 1320, an SMF 1322, for communication with a UE 1316, a (R)AN 1306, a UPF 1302, and a DN 1304. The NFs and NF services can communicate directly, referred to as Direct Communication, or indirectly via a SCP 1324, referred to as Indirect Communication. FIG. 13 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 13 are described below.

The NSSF 1308 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or based on configuration, a list of candidate AMF(s), possibly by querying the NRF.

The NEF 1310 supports exposure of capabilities and events. NF capabilities and events may be securely exposed by the NEF 1310 (e.g., for 3rd party, Application Functions, and/or Edge Computing). The NEF 1310 may store/retrieve information as structured data using a standardized interface (Nudr) to a UDR. The NEF 1310 may also secure provision of information from an external application to 3GPP network and may provide for the Application Functions to securely provide information to the 3GPP network (e.g., expected UE behavior, 5GLAN group information, and service specific information), wherein the NEF 1310 may authenticate and authorize and assist in throttling the Application Functions. The NEF 1310 may provide translation of internal-external information by translating between information exchanged with the AF and information exchanged with the internal network function. For example, the NEF 1310 translates between an AF-Service-Identifier and internal 5G Core information such as DNN and S-NSSAI. The NEF 1310 may handle masking of network and user sensitive information to external AF's according to the network policy. The NEF 1310 may receive information from other network functions (based on exposed capabilities of other network functions), and stores the received information as structured data using a standardized interface to a UDR. The stored information can be accessed and re-exposed by the NEF 1310 to other network functions and Application Functions, and used for other purposes such as analytics. For external exposure of services related to specific UE(s), the NEF 1310 may reside in the HPLMN. Depending on operator agreements, the NEF 1310 in the HPLMN may have interface(s) with NF(s) in the VPLMN. When a UE is capable of switching between EPC and SGC, an SCEF+NEF may be used for service exposure.

The NRF 1314 supports service discovery function by receiving an NF Discovery Request from an NF instance or SCP and providing the information of the discovered NF instances to the NF instance or SCP. The NRF 1314 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 1312 supports a unified policy framework to govern network behavior. The PCF 1312 provides policy rules to Control Plane function(s) to enforce them. The PCF 1312 accesses subscription information relevant for policy decisions in a Unified Data Repository (UDR). The PCF 1312 may access the UDR located in the same PLMN as the PCF.

The UDM 1326 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 1326 uses subscription data (including authentication data) that may be stored in a UDR, in which case a UDM implements the application logic and may not require an internal user data storage and several different UDMs may serve the same user in different transactions. The UDM 1326 may be located in the HPLMN of the subscribers it serves, and may access the information of the UDR located in the same PLMN.

The AUSF 1318 supports authentication for 3GPP access and untrusted non-3GPP access. The AUSF 1318 may also provide support for Network Slice-Specific Authentication and Authorization.

The AMF 1320 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 1320. Regardless of the number of Network functions, in certain embodiments there is only one NAS interface instance per access network between the UE and the CN, terminated at one of the Network functions that implements at least NAS security and Mobility Management. The AMF 1320 may also include policy related functionalities.

In addition to the functionalities described above, the AMF 1320 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 1322 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAB (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 1322 may include policy related functionalities.

The SCP 1324 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 1324 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 1316 may include a device with radio communication capabilities. For example, the UE 1316 may comprise a smartphone (e.g., handheld touchscreen mobile computing devices connectable to one or more cellular networks). The UE 1316 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 1316 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 1316 may be configured to connect or communicatively couple with the (R)AN 1306 through a radio interface 1330, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 1316 and the (R)AN 1306 may use a Uu interface (e.g., an LTE-Uu interface) to exchange control plane data via a protocol stack comprising a PHY layer, an MAC layer, an RLC layer, a PDCP layer, and an RRC layer. A DL transmission may be from the (R)AN 1306 to the UE 1316 and a UL transmission may be from the UE 1316 to the (R)AN 1306. The UE 1316 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 1306 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 1306 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 1306) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 1316 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 1302 may act as an anchor point for intra-RAT and inter-RAT mobility, an external PDU session point of interconnect to the DN 1304, and a branching point to support multi-homed PDU session. The UPF 1302 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 1302 may include an uplink classifier to support routing traffic flows to a data network. The DN 1304 may represent various network operator services, Internet access, or third party services. The DN 1304 may include, for example, an application server.

Figure 14:
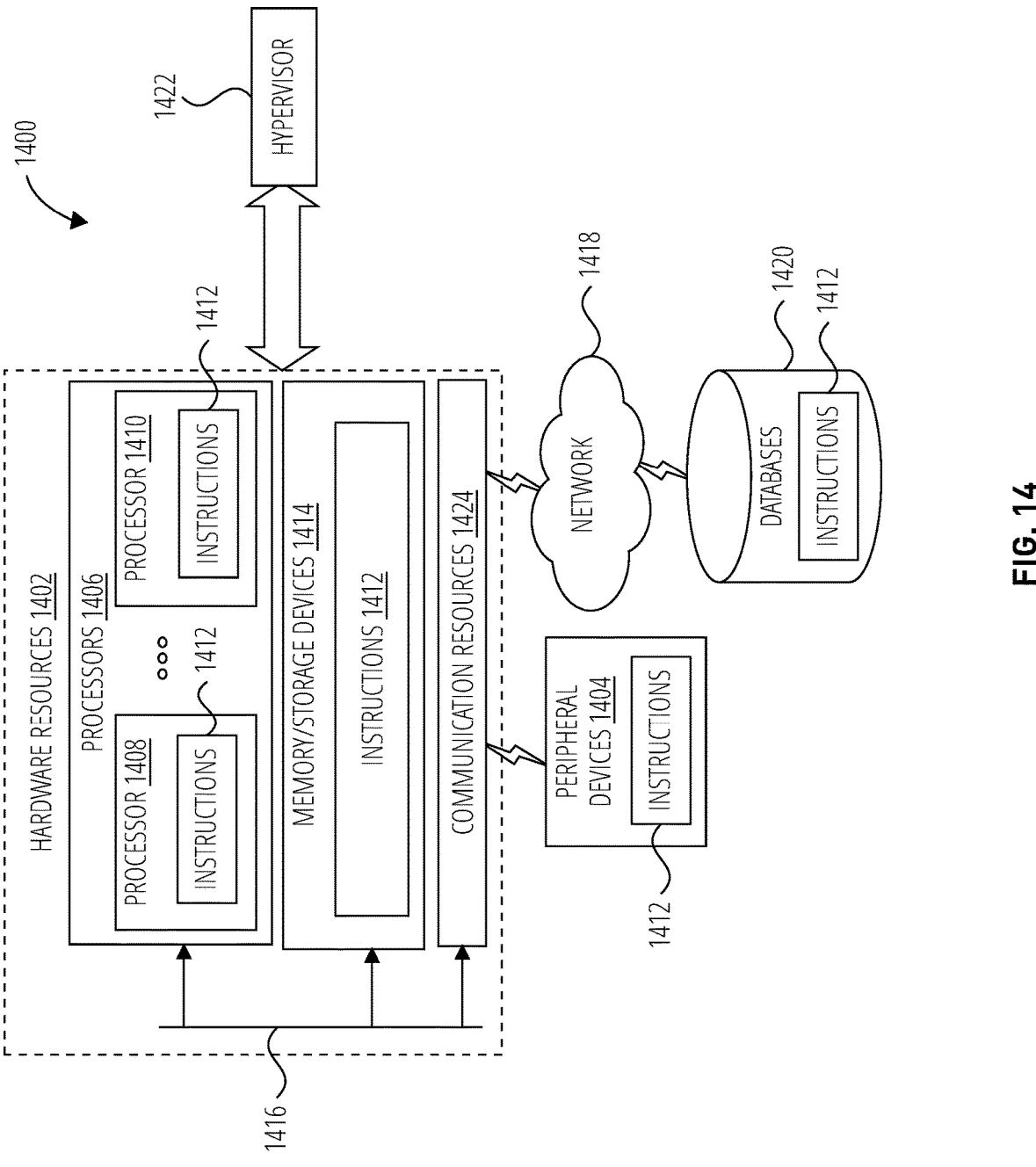
FIG. 14 illustrates components in accordance with one embodiment.

FIG. 14 is a block diagram illustrating components 1400, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1402 including one or more processors 1406 (or processor cores), one or more memory/storage devices 1414, and one or more communication resources 1424, each of which may be communicatively coupled via a bus 1416. For embodiments where node virtualization (e.g., NFV) is utilized, a hypervisor 1422 may be executed to provide an execution environment for one or more network slices/sub-slices to utilize the hardware resources 1402.

The processors 1406 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1408 and a processor 1410.

The memory/storage devices 1414 may include main memory, disk storage, or any suitable combination thereof. The memory/storage devices 1414 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1424 may include interconnection or network interface components or other suitable devices to communicate with one or more peripheral devices 1404 or one or more databases 1420 via a network 1418. For example, the communication resources 1424 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1412 may comprise software, a program, an application, an applet, an app, or other executable code for causing at least any of the processors 1406 to perform any one or more of the methodologies discussed herein. The instructions 1412 may reside, completely or partially, within at least one of the processors 1406 (e.g., within the processor's cache memory), the memory/storage devices 1414, or any suitable combination thereof. Furthermore, any portion of the instructions 1412 may be transferred to the hardware resources 1402 from any combination of the peripheral devices 1404 or the databases 1420. Accordingly, the memory of the processors 1406, the memory/storage devices 1414, the peripheral devices 1404, and the databases 1420 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 is a method of a user equipment (UE), comprising: receiving, from a network, one of a notification request and mobile terminated (MT) paging; determining that a protocol data unit (PDU) session that was previously available at the UE is no longer available at the UE; determining that a registration request message indicating that the PDU session is no longer available at the UE has not been sent to the network; and sending, to the network, based on the determination that the registration request message has not been sent to the network, a message comprising a PDU session status information element (IE) that indicates that the PDU session is no longer available at the UE.

Example 2 is the method of Example 1, wherein the message comprising the PDU session status IE is a service request message.

Example 3 is the method of Example 1, wherein the message comprising the PDU session status IE is the registration request message.

Example 4 is the method of any of Examples 1-3, wherein the determination that the PDU session is no longer available at the UE is based upon a determination that the PDU session is not currently active at the UE.

Example 5 is the method of any of Examples 1-3, wherein determining that the PDU session is no longer available at the UE is based upon a determination that the PDU session is being deactivated at the UE.

Example 6 is the method of any of Examples 1-5, further comprising determining that the network has been informed that the PDU session is no longer available at the UE based upon a receipt, from the network, of a reply message corresponding to the message comprising the PDU session status IE.

Example 7 is the method of Example 6, wherein the reply message is a service accept message.

Example 8 is the method of Example 6, wherein the reply message is a registration accept message.

Example 9 is the method of any of Examples 1-5, further comprising: determining that the network has not been informed that the PDU session is no longer available at the UE based upon a failure to receive, from the network, a reply message corresponding to the message comprising the PDU session status IE; and sending, to the network, based on the determination that the network has not been informed that the PDU session is no longer available at the UE, a second message comprising a second PDU session status IE that indicates that the PDU session is no longer available at the UE.

Example 10 is a method of a user equipment (UE), comprising: receiving, from a network, one of a notification request and mobile terminated (MT) paging; determining that a protocol data unit (PDU) session that was previously available at the UE is no longer available at the UE; determining that a registration request message indicating that the PDU session is no longer available at the UE has not been sent to the network; sending, to the network, based on the determination that the registration request message has not been sent to the network, a PDU session release request message for the PDU session.

Example 11 is a method of a user equipment (UE), comprising: determining that the UE has data to be sent to a network on uplink (UL); detecting a change in a protocol data unit (PDU) session status maintained by the UE; and sending, to the network, a message comprising a PDU session status information element (IE) that indicates the PDU session status maintained by the UE based on the determination that the UE has pending data for UL and the detection of the change in the PDU session status maintained by the UE.

Example 12 is the method of Example 11, wherein the message comprising the PDU session status IE is a service request message.

Example 13 is the method of Example 11, wherein the message comprising the PDU session status IE is a registration request message.

Example 14 is the method of any of Examples 11-13, further comprising determining that the network has received the PDU session status maintained by the UE based upon a receipt, from the network, of a reply message corresponding to the message comprising the PDU session status IE.

Example 15 is the method of Example 14, wherein the reply message is a service accept message.

Example 16 is the method of Example 14, wherein the reply message is a registration accept message.

Example 17 is the method of any of Examples 11-14, further comprising: determining that the network has not received the PDU session status maintained by the UE based upon a failure to receive, from the network, a reply message corresponding to the message comprising the PDU session status IE, and; sending, to the network, based on the determination that the network has not received the PDU session status maintained by the UE, a second message comprising a second PDU session status IE that indicates the PDU session status maintained by the UE.

Example 18 is a method of an access and mobility function (AMF) of a network, comprising: processing a service request message sent by a user equipment (UE) to the network, the service request message indicating that one or more protocol data unit (PDU) sessions are active at the UE; determining, based on a PDU session status maintained at the AMF, that the one or more PDU sessions that are active at the UE are active at the network; and generating, in response to the determination that the one or more PDU sessions that are active at the UE are active at the network, a service accept message that does not include a PDU session status information element (IE).

Example 19 is a method of a user equipment (UE), comprising: sending a service request message containing a first PDU session status information element (IE) to a network, the service request message indicating that one or more protocol data unit (PDU) sessions are active at the UE; receiving, from the network, a service accept message in response to the service request message; determining that the service accept message from the network does not contain any PDU session status IE; and determining, based on the determination that the service accept message from the network does not contain any PDU session status IE, that the one or more PDU sessions that are active at the UE are active at the network.

Example 20 is a method of an access and mobility function (AMF) of a network, comprising: detecting a lower layer failure at the AMF; determining that a reply message corresponding to a message comprising a PDU session status IE received at the network from a UE was not sent by the network prior to the lower layer failure; determining that a PDU session status maintained by the AMF has not been indicated to the UE based upon the determination that the reply message was not sent by the network prior to the lower layer failure; and sending, to the UE, based on the determination that the PDU session status maintained by the AMF has not been indicated to the UE, a second message comprising a PDU session status IE that indicates the PDU session status maintained by the AMF.

Example 21 is a method of a user equipment (UE), comprising: receiving, from a network, an indication to establish, with the network, a data radio bearer (DRB); determining that the DRB corresponds to a protocol data unit (PDU) session that is not active at the UE; and sending, to the network, in response to the determination that the DRB corresponds to a PDU session that is not active at the UE, a message comprising a PDU session status information element (IE) that indicates that the PDU session is not active at the UE.

Example 22 is the method of Example 21, wherein the UE: is in a 5GMM-CONNECTED mode; and has an RRC Inactive indication.

Example 23 is the method of any of Examples 21 and 22, wherein the message comprising the PDU session status IE is a service request message.

Example 24 is the method of any of Examples 21 and 22, wherein the message comprising the PDU session status IE is a registration request message, and wherein the UE does not send a service request message comprising the PDU session status IE in response to the determination that the DRB corresponds to a PDU session that is not active at the UE.

Example 25 may include an apparatus comprising means to perform one or more elements of a method described in or related to any of the above Examples, or any other method or process described herein.

Example 26 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 27 may include an apparatus comprising logic, modules, or circuitry to perform one or more elements of a method described in or related to any of the above Examples, or any other method or process described herein.

Example 28 may include a method, technique, or process as described in or related to any of the above Examples, or portions or parts thereof Example 29 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 30 may include a signal as described in or related to any of the above Examples, or portions or parts thereof.

Example 31 may include a datagram, packet, frame, segment, protocol data unit (PDU), or message as described in or related to any of the above Examples, or portions or parts thereof, or otherwise described in the present disclosure.

Example 32 may include a signal encoded with data as described in or related to any of the above Examples, or portions or parts thereof, or otherwise described in the present disclosure.

Example 33 may include a signal encoded with a datagram, packet, frame, segment, PDU, or message as described in or related to any of the above Examples, or portions or parts thereof, or otherwise described in the present disclosure.

Example 34 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 35 may include a computer program comprising instructions, wherein execution of the program by a processing element is to cause the processing element to carry out the method, techniques, or process as described in or related to any of the above Examples, or portions thereof.

Example 36 may include a signal in a wireless network as shown and described herein.

Example 37 may include a method of communicating in a wireless network as shown and described herein.

Example 38 may include a system for providing wireless communication as shown and described herein.

Example 39 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE), comprising:

receiving, from a network, one of a notification request and mobile terminated (MT) paging;

determining that a protocol data unit (PDU) session that was previously available at the UE is no longer available at the UE;

determining that a registration request message indicating that the PDU session is no longer available at the UE has not been sent to the network; and sending, to the network, based on the determination that the registration request message has not been sent to the network, a message comprising a PDU session status information element (IE) that indicates that the PDU session is no longer available at the UE.

2. The method of claim 1, wherein the message comprising the PDU session status IE is a service request message.

3. The method of claim 1, wherein the message comprising the PDU session status IE is the registration request message.

4. The method of claim 1, wherein the determination that the PDU session is no longer available at the UE is based upon a determination that the PDU session is not currently active at the UE.

5. The method of claim 1, wherein determining that the PDU session is no longer available at the UE is based upon a determination that the PDU session is being deactivated at the UE.

6. The method of claim 1, further comprising determining that the network has been informed that the PDU session is no longer available at the UE based upon a receipt, from the network, of a reply message corresponding to the message comprising the PDU session status IE.

7. The method of claim 6, wherein the reply message is a service accept message.

8. The method of claim 6, wherein the reply message is a registration accept message.

9. The method of claim 1, further comprising:

determining that the network has not been informed that the PDU session is no longer available at the UE based upon a failure to receive, from the network, a reply message corresponding to the message comprising the PDU session status IE; and sending, to the network, based on the determination that the network has not been informed that the PDU session is no longer available at the UE, a second message comprising a second PDU session status IE that indicates that the PDU session is no longer available at the UE.

10. A method of a user equipment (UE), comprising:

determining that the UE has data to be sent to a network on uplink (UL);

detecting a change in a protocol data unit (PDU) session status maintained by the UE; and sending, to the network, a message comprising a PDU session status information element (IE) that indicates the PDU session status maintained by the UE based on the determination that the UE has pending data for UL and the detection of the change in the PDU session status maintained by the UE.

11. The method of claim 10, wherein the message comprising the PDU session status IE is a service request message.

12. The method of claim 10, wherein the message comprising the PDU session status IE is a registration request message.

13. The method of claim 10, further comprising determining that the network has received the PDU session status maintained by the UE based upon a receipt, from the network, of a reply message corresponding to the message comprising the PDU session status IE.

14. The method of claim 13, wherein the reply message is a service accept message.

15. The method of claim 13, wherein the reply message is a registration accept message.

16. The method of claim 10, further comprising:
  determining that the network has not received the PDU session status maintained by the UE based upon a failure to receive, from the network, a reply message corresponding to the message comprising the PDU session status IE, and;

sending, to the network, based on the determination that the network has not received the PDU session status maintained by the UE, a second message comprising a second PDU session status IE that indicates the PDU session status maintained by the UE.

17. A method of an access and mobility function (AMF) of a network, comprising:

processing a service request message sent by a user equipment (UE) to the network, the service request message indicating that one or more protocol data unit (PDU) sessions are active at the UE;

determining, based on a PDU session status maintained at the AMF, that the one or more PDU sessions that are active at the UE are active at the network; and generating, in response to the determining that the one or more PDU sessions that are active at the UE are active at the network, a service accept message that does not include a PDU session status information element (IE).

* * * * *